Figure 1:
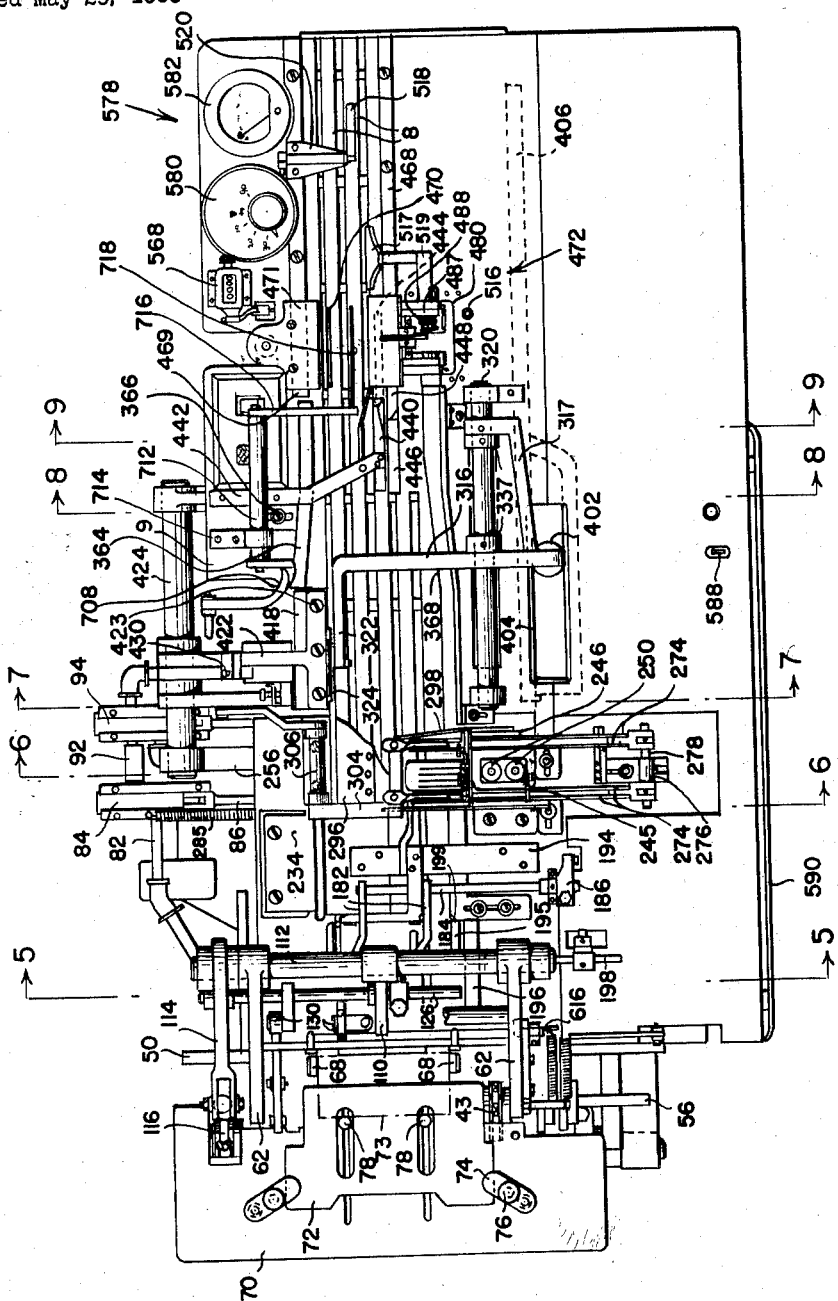

July 22, 1958

A. E. WHITECAR 2,843,982

INSERTING APPARATUS

Filed May 29, 1953

12 Sheets-Sheet 1

INVENTOR.
ALTEN E. WHITECAR
BY
ATTORNEYS

INVENTOR.
ALTEN E. WHITECAR

July 22, 1958

A. E. WHITECAR 2,843,982

INSERTING APPARATUS

Filed May 29, 1953

12 Sheets-Sheet 5

INVENTOR.
ALTEN E. WHITECAR
BY
ATTORNEYS

July 22, 1958

A. E. WHITECAR 2,843,982

INSERTING APPARATUS

Filed May 29, 1953

12 Sheets-Sheet 6

INVENTOR.
ALTEN E. WHITECAR
BY
ATTORNEYS

July 22, 1958

A. E. WHITECAR 2,843,982

INSERTING APPARATUS

Filed May 29, 1953

12 Sheets-Sheet 9

INVENTOR.
ALTEN E. WHITECAR

BY

ATTORNEYS

July 22, 1958 A. E. WHITECAR 2,843,982
INSERTING APPARATUS

Filed May 29, 1953 12 Sheets-Sheet 11

INVENTOR.
ALTEN E. WHITECAR
BY
ATTORNEYS

INVENTOR.
ALTEN E. WHITECAR

# United States Patent Office 2,843,982
Patented July 22, 1958

2,843,982

INSERTING APPARATUS

Alten E. Whitecar, Westville, N. J., assignor to Smith, Kline & French Laboratories, Philadelphia, Pa., a corporation of Pennsylvania Application May 29, 1953, Serial No. 358,285

25 Claims. (Cl. 53—55)

This invention relates to inserting apparatus and, more particularly, relates to inserting apparatus which functions to form a cover sheet with an article inserted and secured therein.

The apparatus in accordance with this invention can be used for the formation of cover sheet assemblies containing inserted articles of widely different types. Thus, for example, the article inserted may be a material-containing package or merely a single sheet having printed matter thereon.

It is an object of this invention to provide a machine which will form a cover sheet assembly having an article secured to the cover sheet.

It is a further object of this invention provide a machine which will form a cover sheet assembly containing an article and mark the assembly with an indicia of identification.

It is an additional object of this invention to provide a machine having suitable indicating means and operation arresting means to stop the machine in the event of improper feeding of either a cover sheet or an article to be inserted into the machine.

Without limitation, the invention will be illustrated by a machine adapted to provide a catch cover containing therein a tablet package comprising cellophane sheets heat sealed together and having positioned therebetween a number of tablets.

The machine embodying the invention and described for purposes of illustration will perform the following sequence of operations:

A catch cover sheet is taken from the bottom of a stack of sheets in a magazine and deposited on a conveyor at the first station on the conveyor and aligned in position thereon with respect to a guide bar.

The conveyor then carries the catch cover to a second station where a lower fold is made in the catch cover.

The conveyor then carries the catch cover to a third station on the conveyor where the tablet package is inserted into the lower fold of the catch cover.

The catch cover is then carried to a fourth station on the conveyor where the tablet package is heat sealed within the lower fold of the catch cover.

The catch cover is then carried to a fifth station on the conveyor where it is aligned with its upper and lower edges in position against guide bars.

The catch cover is then carried to a sixth station on the conveyor where a 90° bend is made in the top flap.

The catch cover is then carried to a seventh station on the conveyor where the top flap is tucked in under the lower flap to close the completely assembled cover.

The catch cover sheet is then carried to an eighth station on the conveyor where the tucked-in flap is pressed downwardly to insure the complete insertion thereof.

The catch cover is then carried to a ninth station on the conveyor where the successive catch covers are counted.

The catch cover is then discharged from the machine.

Figure 2:
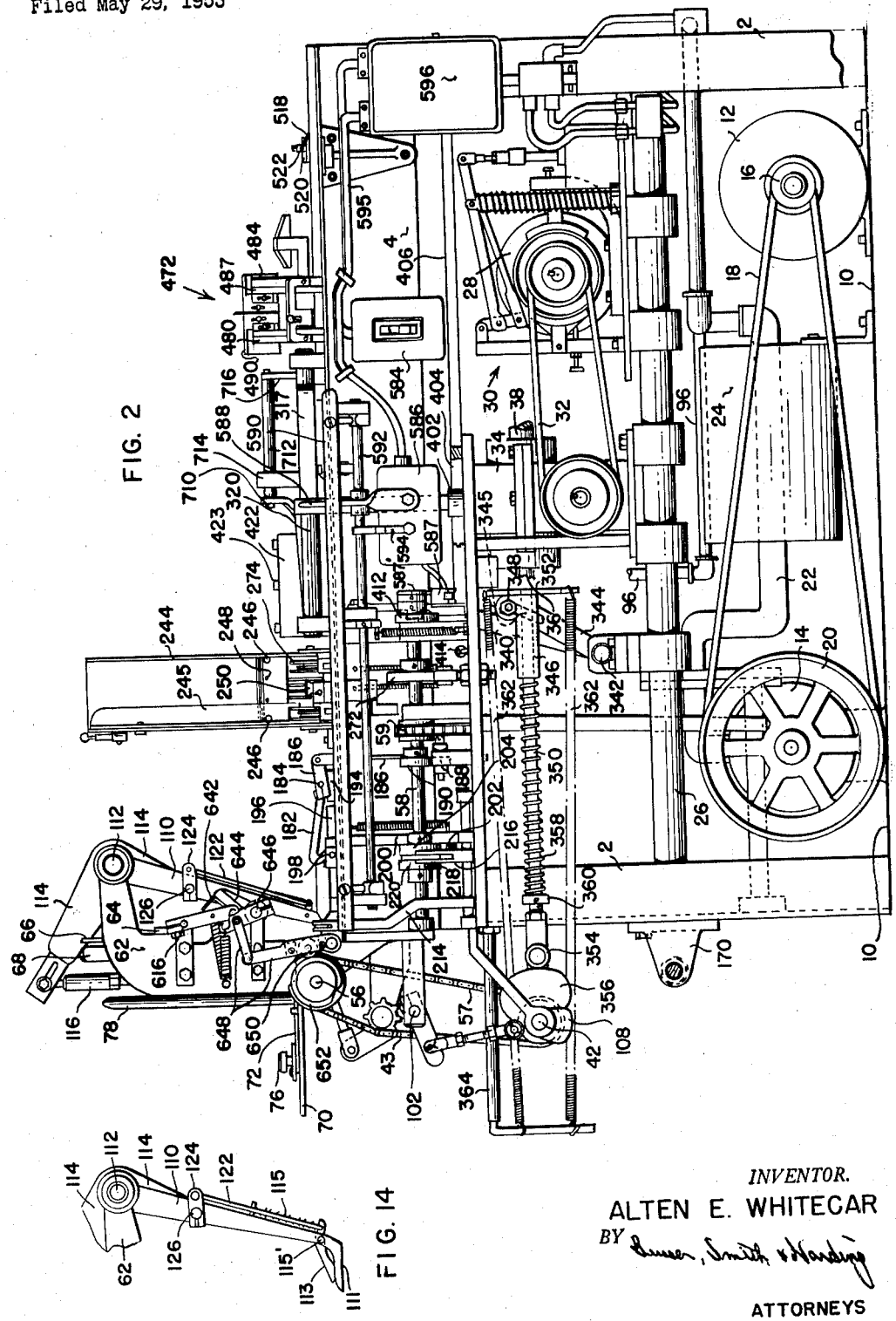
Figure 3:
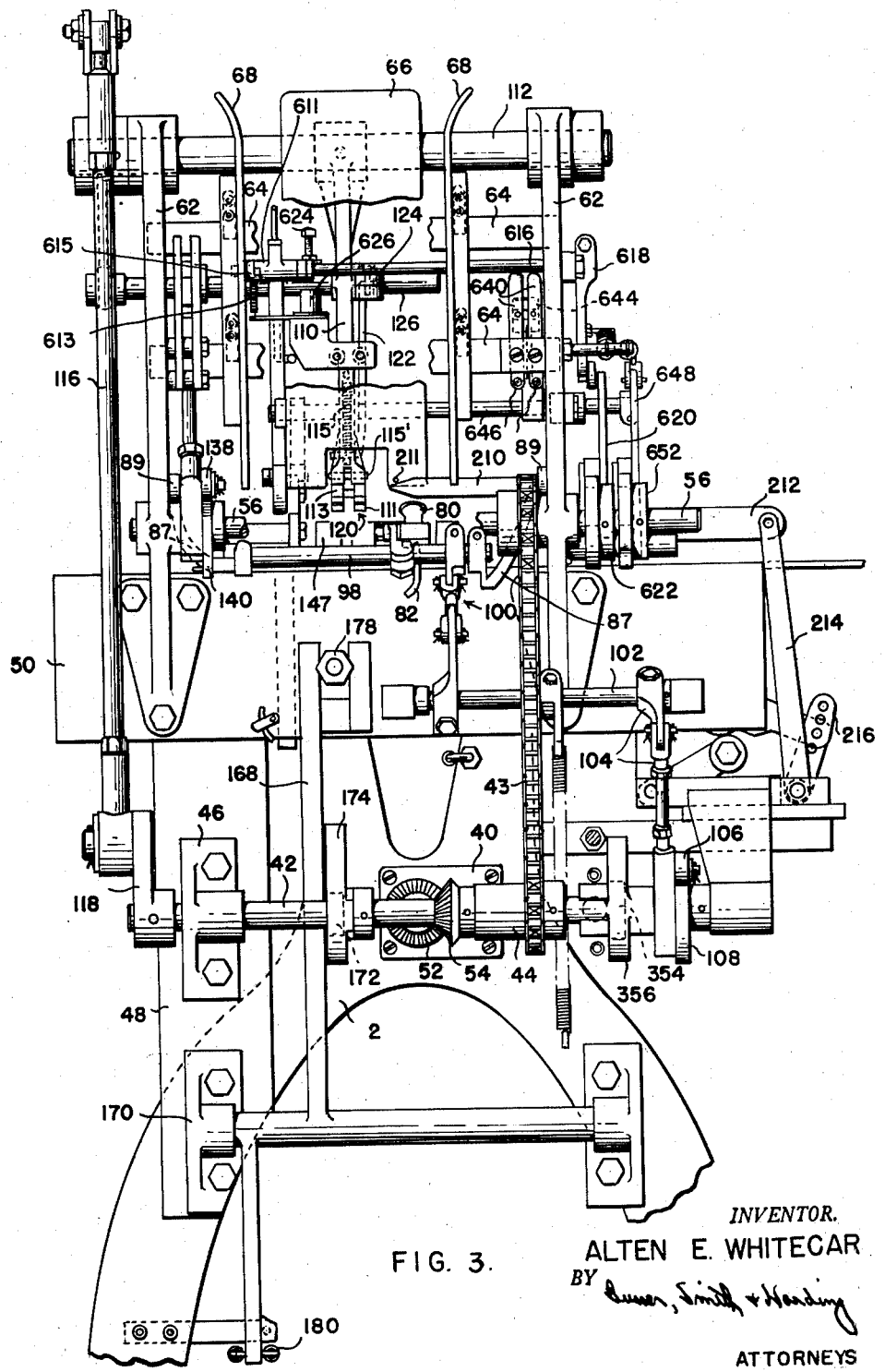
Figure 4:
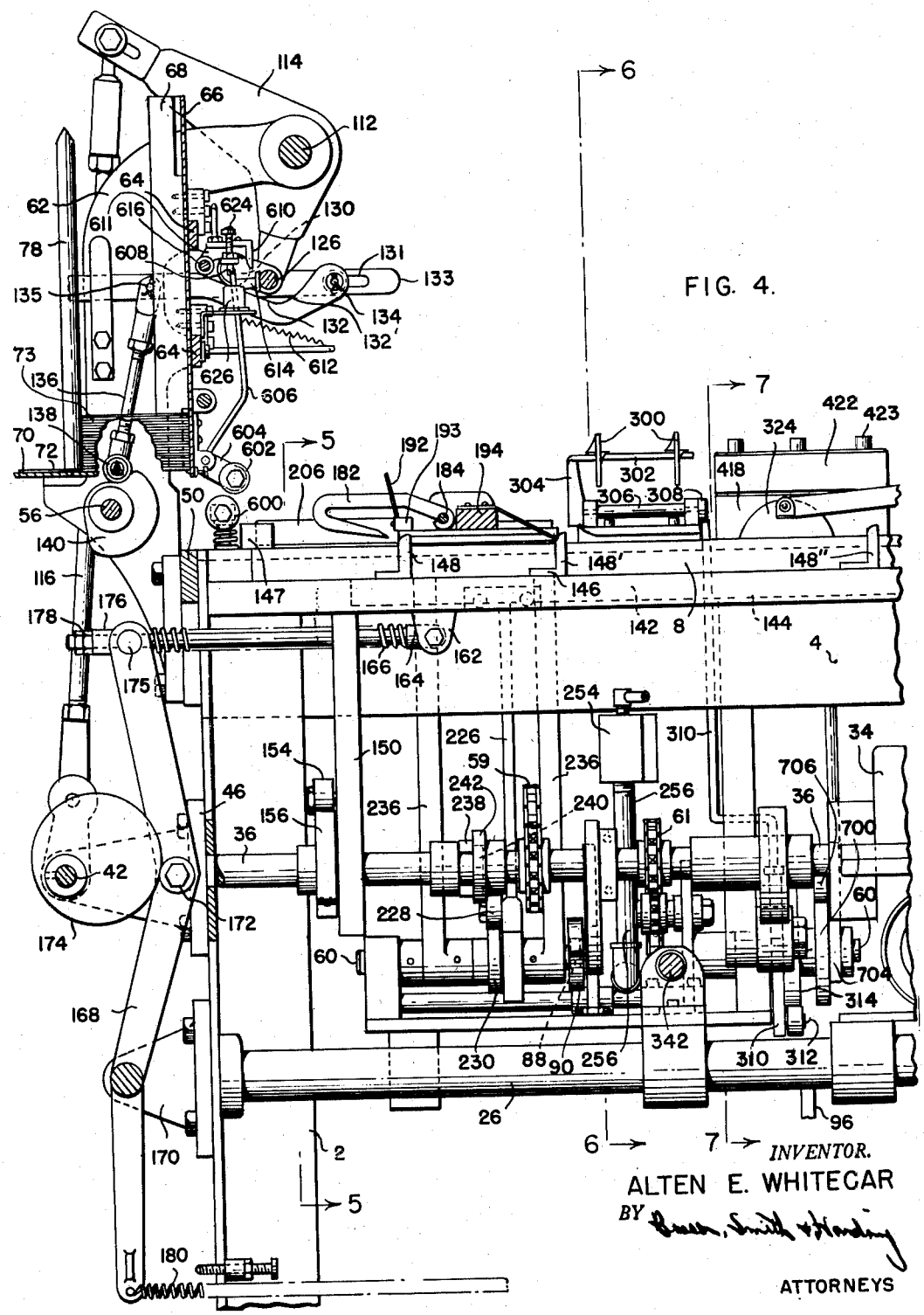
Figure 5:
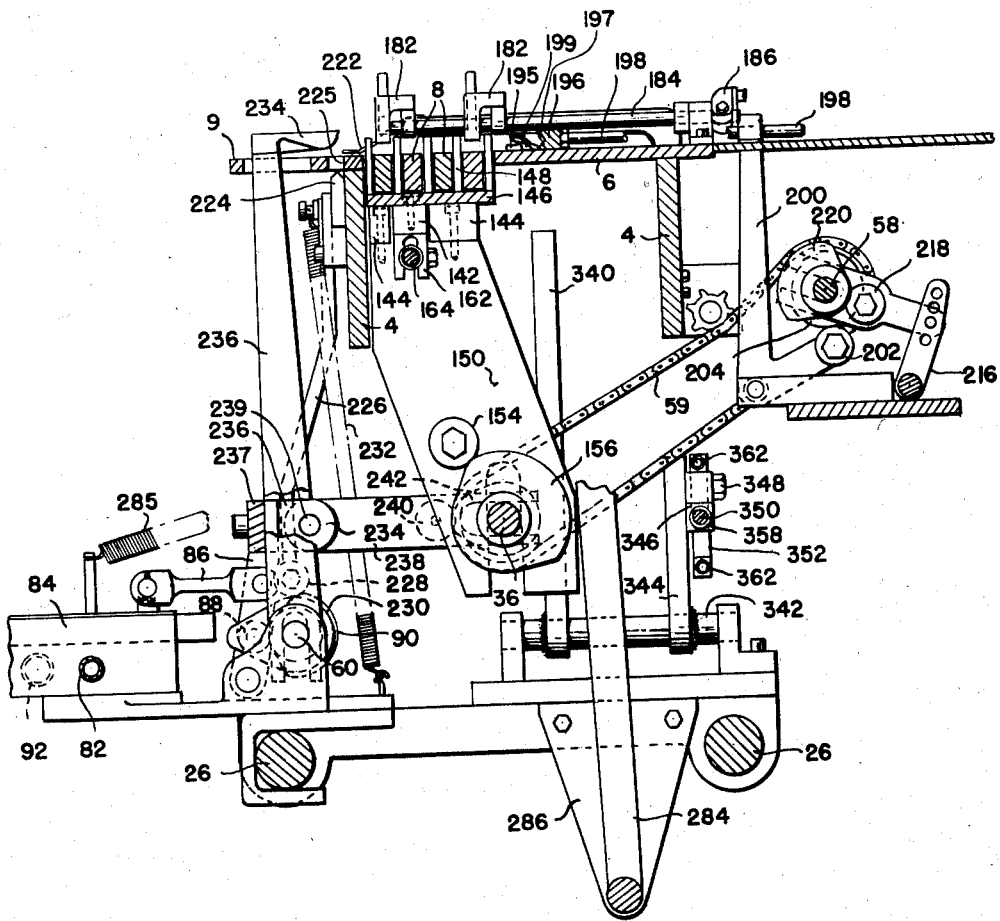
Figure 6:
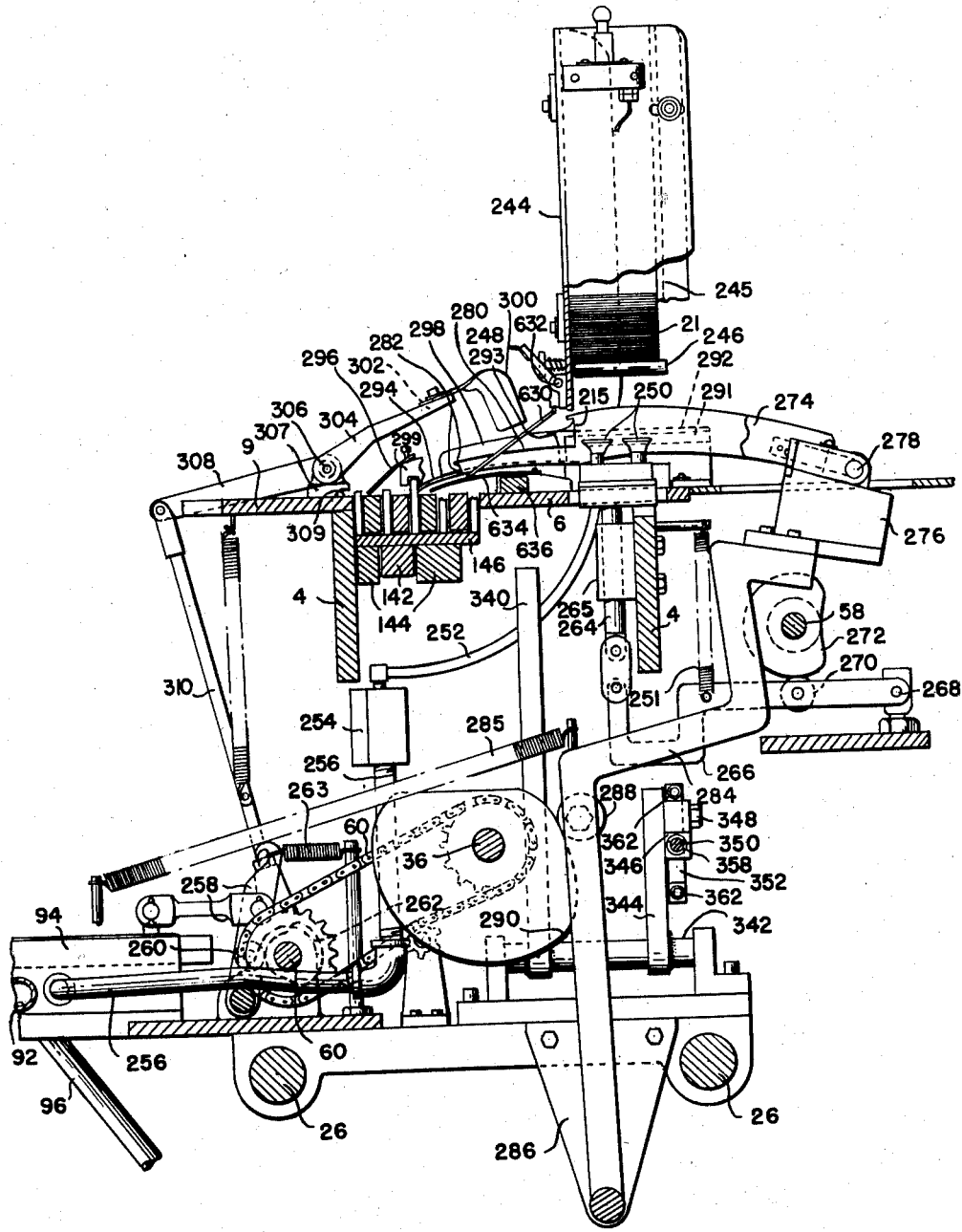
Figure 7:
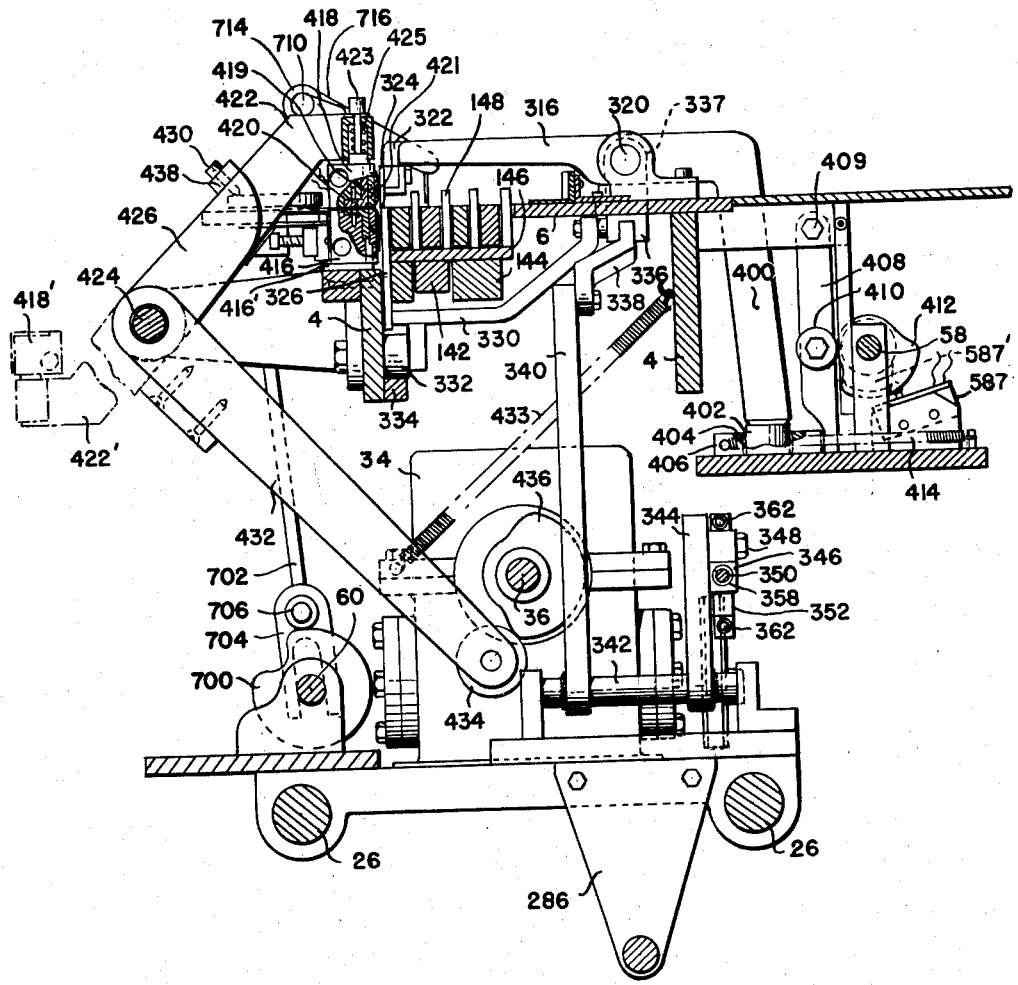
Figure 8:
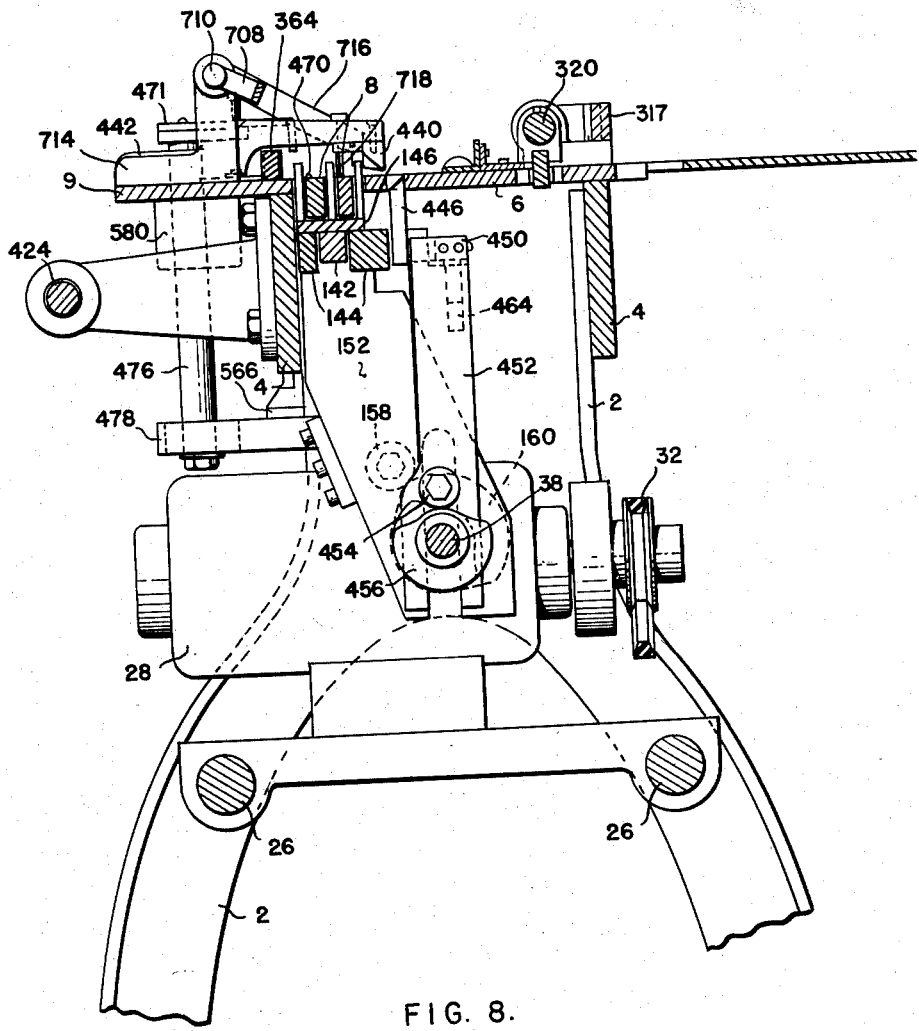
Figure 9:
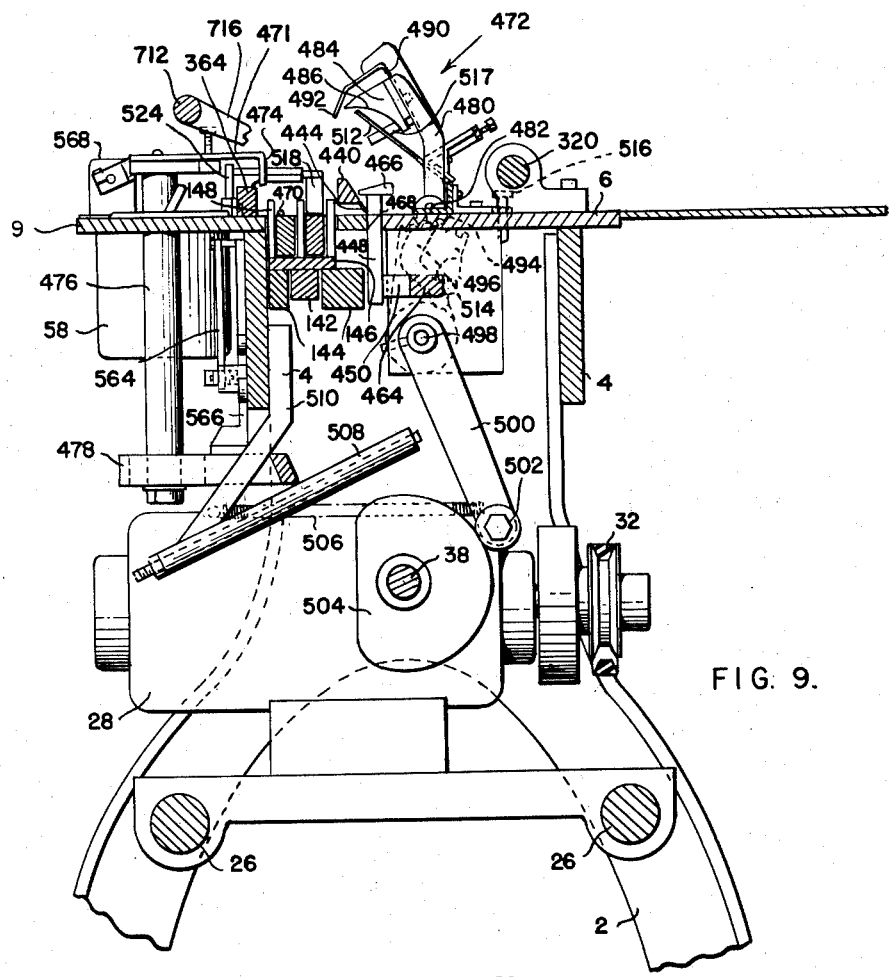
Figure 11:
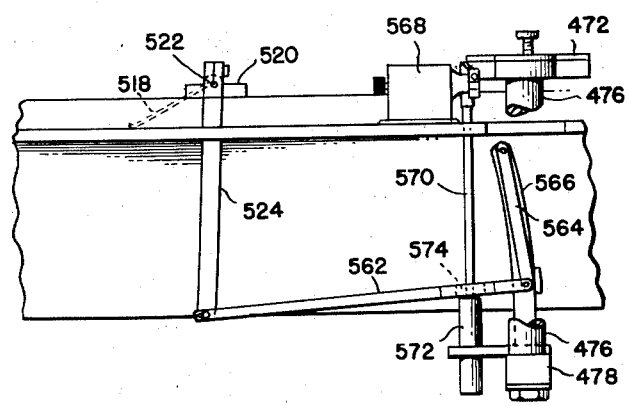
Figure 10:
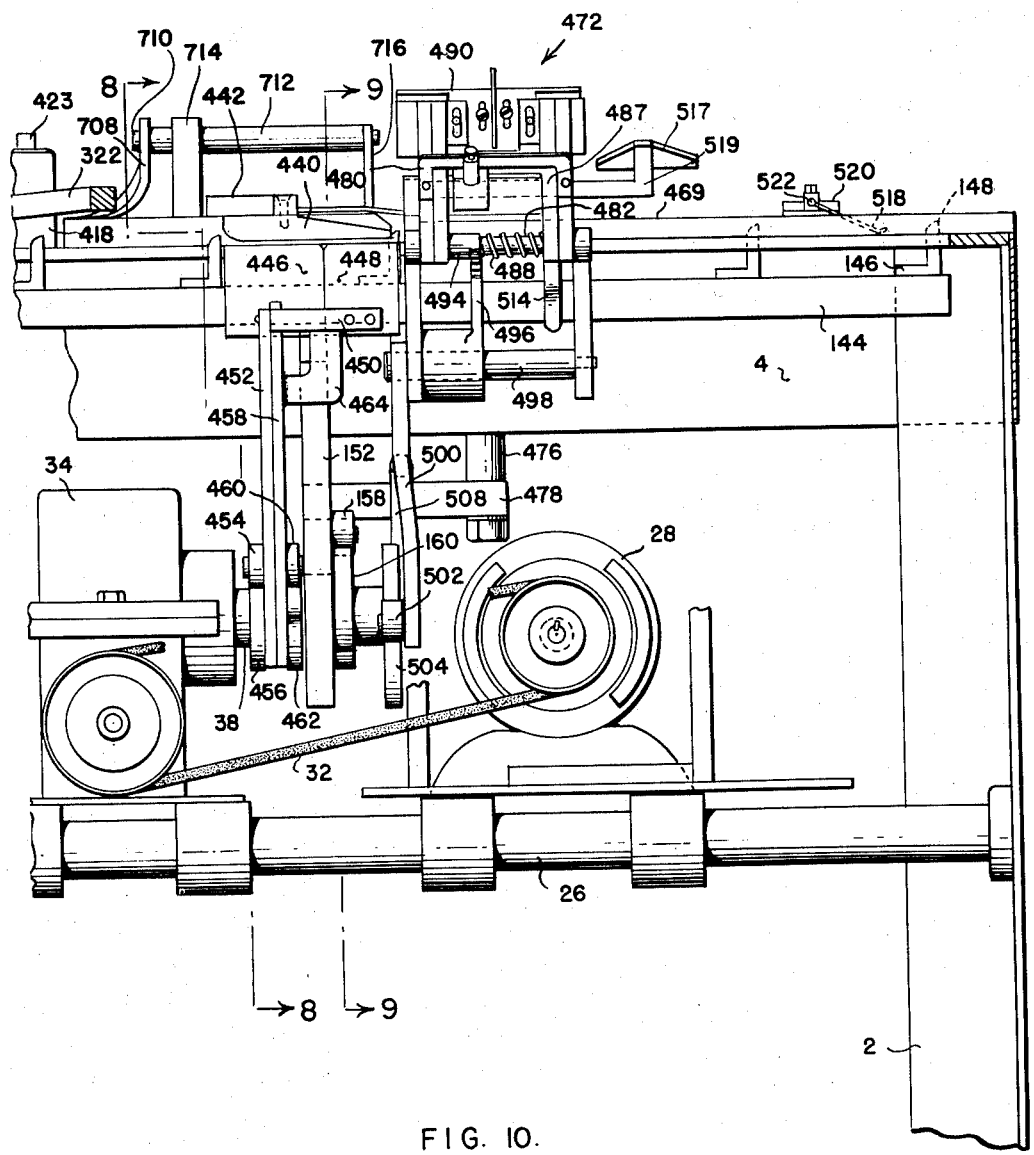
Figure 12:
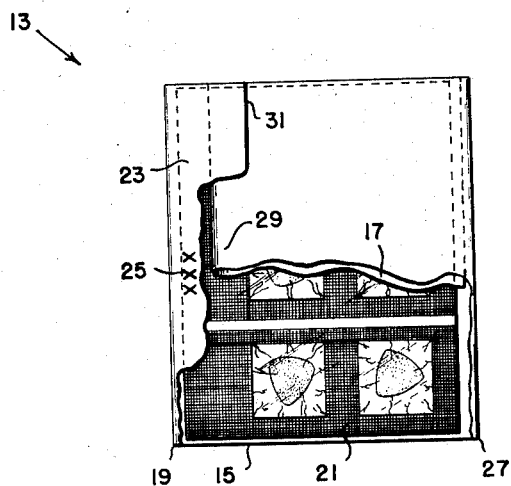
Figure 13:
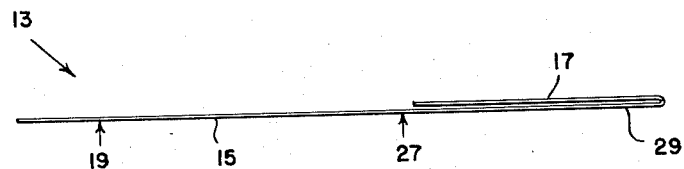
Figure 15:
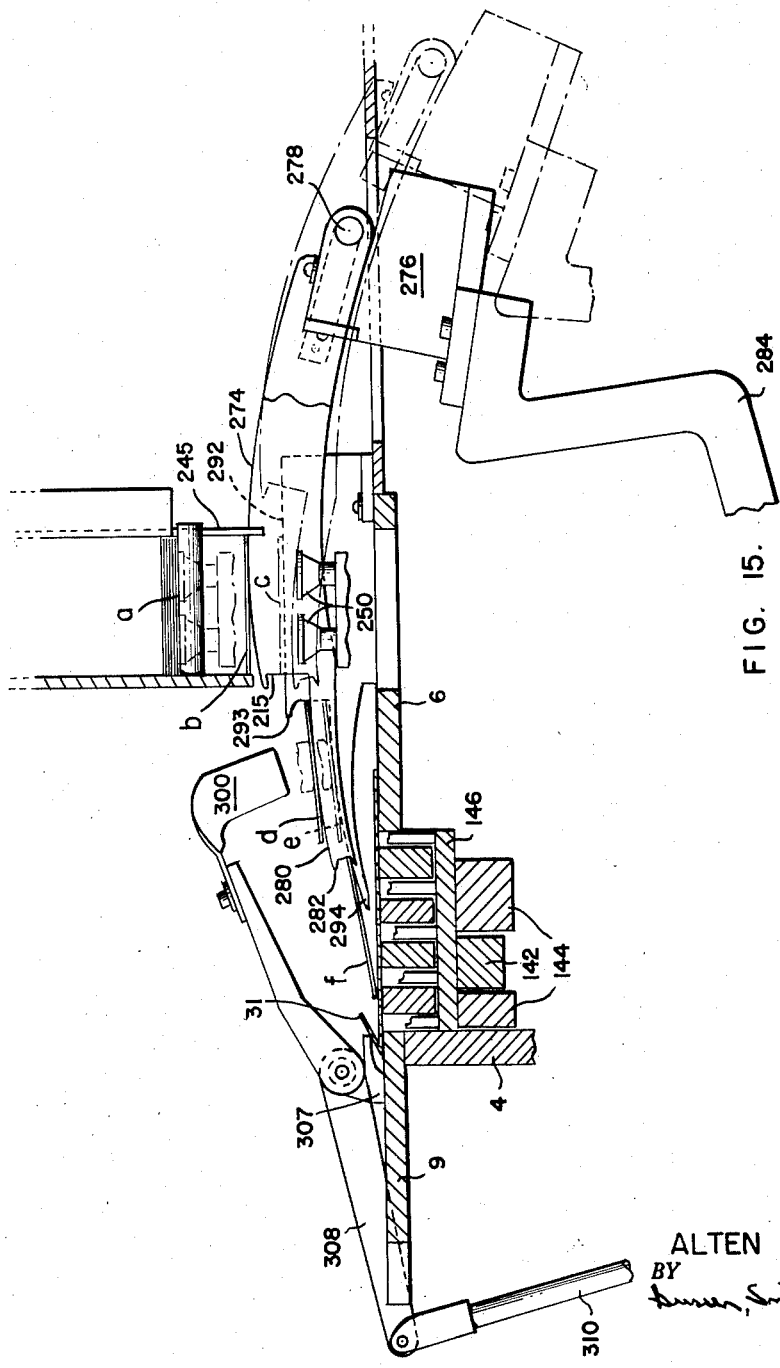

This embodiment of the invention will be further clarified and other objects of the invention will become apparent on reading the description in conjunction with the drawings in which:

Figure 1 is a top view of the machine;
Figure 2 is a front elevation of the machine;
Figure 3 is an elevation of the left end of the machine partly in section;
Figure 4 is a vertical section through the left end portion of the machine as viewed from the front of the machine;
Figure 5 is a transverse section through a portion of the machine taken on the trace 5—5 of Figure 1;
Figure 6 is a transverse section through a portion of the machine taken on the trace 6—6 of Figure 1;
Figure 7 is a transverse section through a portion of the machine taken on the trace 7—7 of Figure 1;
Figure 8 is a transverse section through a portion of the machine taken on the trace 8—8 of Figure 1;
Figure 9 is a transverse section through a portion of the machine taken on the trace 9—9 of Figure 1;
Figure 10 is an enlarged fragmentary vertical section through a portion of the right-hand end of the machine as viewed from the front of the machine;
Figure 11 is an enlarged fragmentary elevation of the right-hand rear of the machine;
Figure 12 is a partially cut away front view of a catch cover assembly;
Figure 13 is a side view of a catch cover sheet in the form in which it is inserted into the catch cover assembly machine,
Figure 14 is an elevation of a fragmentary portion of the apparatus shown in Figure 3; and
Figure 15 is an elevation of a fragmentary portion of the apparatus shown in Figure 6 with parts shown in two different operating positions.

In Figure 13 there is shown generally at 13 a catch cover sheet 15 which includes a folded portion 17. The catch cover sheet is adapted to be formed on the bend line indicated at 19 to provide the lower front flap 31 of the catch cover as shown in Figure 12.

A conventional cellophane tablet package 21 comprises a pair of sheets of cellophane heat sealed together in regions surrounding tablets positioned between the sheets. The tablet package is retained under the folded flap 31. The flap 31 and the back of the catch cover sheet 15 and the cellophane tablet package are heat sealed together in the region indicated by the numeral 23. If desired, identifying indicia, as indicated at 25, may be applied to the assembly at the time the heat sealing operation is accomplished.

The catch cover sheet shown in Figure 13 is also adapted to be formed on the bend line indicated at 27 and the upper flap 29 of the catch cover sheet is tucked under the upper edge of the lower flap 31 when the package is in a fully assembled condition. The catch cover assembly machine for forming the catch cover sheet around the tablet package and for accomplishing the heat sealing operation will now be described.

Referring to the drawings, the machine includes a pair of end frame legs 2 supporting at the upper ends thereof a pair of longitudinally extending frame plates 4. Mounted on the front frame plate and between the end frame legs 2 is a top plate 6, and back of the plate 6 are spaced bars 8 which also extend between the end frame legs 2.

A lower mounting plate 10 extends between the frame legs and provides a support for a motor 12 and a vacuum pump 14. The motor has affixed to its shaft a pulley 16 which drives by means of a belt 18 a pulley 20 which is affixed to the shaft of the vacuum pump. The pump is connected by means of pipe line 22 to a vacuum chamber 24.

A pair of support rods 26 extend longitudinally of the machine above the plate 10 and between the frame legs 2 and serve to support a motor 23 and a speed reducer 34. The motor drives the speed reducer through a belt 32 and conventional driving pulleys. There is indicated generally at 30 conventional motor brake mechanism which serves to arrest rotation of the motor and the driving train immediately upon the de-energization of the motor. A left hand main cam shaft 36 is driven by and extends from the left hand side of the speed reducer 34 as viewed in Figures 2 and 4. The left hand main cam shaft 36 extends through the left hand frame legs 2 and is mounted in a bearing pad 40 which is attached to the frame legs. A right hand main cam shaft 38 is driven by and extends from the right hand side of the speed reducer 34 as viewed in Figures 2 and 10.

A lower transverse cam shaft 42 is mounted in a sleeve 44 supported by the bearing pad 40 and is also supported in a bearing 46 mounted on a vertically extending plate 48. The plate 48 is attached to the frame legs 2 and a transverse end plate 50 which is attached to the left ends of the longitudinal frame plates 4. The lower transverse cam shaft 42 is driven by the left hand main cam shaft through the pair of bevelled gears 52 and 54 which are attached to the left hand cam shaft 36 and the lower transverse cam shaft 42, respectively.

In addition to the left hand main cam shaft 36, the right hand main cam shaft 38 and the lower transverse cam shaft 42, the machine is also provided with an upper transverse cam shaft 56 which lies immediately above the lower transverse cam shaft 42, a front longitudinal cam shaft 58 and a rear longitudinal cam shaft 60. The upper transverse cam shaft 56 is driven from the lower transverse cam shaft 42 by a chain belt 43 running over sprocket wheels mounted on each of the cam shafts 56 and 42 as shown in Figure 3. The front longitudinal cam shaft 58 is driven from the left hand main cam shaft 36 by a chain belt 59 running over sprocket wheels mounted on each of the cam shafts 58 and 36 as shown in Figure 5. The rear longitudinal cam shaft 60 is driven from the left hand main cam shaft 36 by a chain belt 61 running over sprocket wheels mounted on each of the cam shafts 36 and 60 as shown in Figure 6.

Referring to the left hand end of the machine, a pair of arms 62 are attached to and extend upwardly from the end plate 50. Attached to the arms 62 is a pair of transversely extending bars 64. Attached to the bars 64 is a vertically extending plate 66 and a pair of vertically extending angle members one on each side of the plate 66 and having opposing faces 68.

The arms 62 also support a horizontal plate 70. A plate 72 rests upon the plate 70 and is held in position thereon by a pair of clips 74 which is affixed to the plate 70 by means of screw studs 76. A pair of adjustably positioned vertically extending rods 78 is also mounted on the plate 70 and extend through slots in the plate 72. The plate 66, the angles 68 and the vertically extending rods 78 provide a retaining magazine in which a stack of catch cover sheets 73 is retained as indicated in Figure 1 and shown in Figure 4.

A suction cup 80 is positioned immediately below the stack of catch cover sheets and is connected by means of a flexible line 82 to a control valve 84. The control valve 84 is actuated through links 86 and a cam follower 88 by a cam 90 mounted on the rear cam shaft 60. The control valve 84 is connected through vacuum line 92, through a junction formed by the control valve 94 to vacuum line 96 to the vacuum tank 24.

The suction cup 80 is mounted on a rocking shaft 98 extending transversely of the left-hand end of the machine. The shaft 98 is supported by links 87 pivotally mounted at 89 on the arms 62 and is adapted to be rocked by rotation of a shaft 102 acting through the linkages indicated generally at 100. The shaft 102 is rotated through linkages indicated at 104 as a result of the action of a cam follower 106 moving over the surface of a cam 108 mounted on the lower transverse cam shaft 42.

A gripper arm 110 is affixed to a shaft 112 which is rotatably mounted in bearings provided in the upper ends of the arms 62. The shaft 112 is adapted to be oscillated by the arm 114 which is also attached thereto. A vertically extending rod 116 is pivotally connected to the outer end of the arm 114 and at its lower end the rod 116 is connected to a crank 118 attached to the back end of the lower transverse cam shaft 42. Thus, as the cam shaft 42 rotates, the gripper arm 110 is oscillated from the position shown in Figure 2 to the right and then back to the left.

The lower end of the arm 110 is formed to provide a lower jaw 111 which cooperates with an upper jaw 113 pivotally mounted on the arm 110 at 115'. These jaws are indicated generally at 120 in Figure 3. The rear end of the jaw 118 is connected to the lower end of and is actuated by a push rod 122, the upper end of which is pivotally mounted in a member 124 which is affixed to a rotatable shaft 126. One end of the shaft 126 is mounted in the gripper arm 110 and the other end of the shaft 126 is mounted in a lower extension of the arm 114. A cam follower 130 is attached to an arm extending from the rotatable shaft 126 and is adapted to ride on the surface 132 of a cam bar. One end of the cam bar is pivoted at 134 in a slot 131 near the right hand end of a horizontally extending strap 133 the left hand end of which is affixed to the rear arm 62. The other end of the cam bar is pivotally mounted at 135 to the upper end of a generally vertically extending link 136. The lower end of the link 136 mounts a cam follower 138 which is adapted to ride on the surface of a cam 140 mounted on the back end of the upper transverse cam shaft 56.

When the machine is in operation and the cam shafts are operating, the suction cup will attach itself to the lowermost catch cover sheet in the magazine and draw the sheet downwardly into a position to be gripped by the gripper jaws when the gripper arm is in the rearward position as indicated in Figure 2. Rotation of the lower transverse cam shaft 42 causes the gripper jaws to move forward or to the right, as viewed in Figure 2, and to carry the catch cover sheet out from under the magazine whereupon, as a result of the action of the cam follower 130 passing up the incline 132' of the cam bar, the gripper jaws will be opened and the catch cover sheet will be permitted to fall upon the spaced bars 8. During this phase of the operation, as a result of the action of the cam 90, the vacuum control valve 84 will disconnect the vacuum lines from the vacuum cup 80 at the proper time to permit the gripper jaw to carry the catch cover sheet away from the vacuum cup. This portion of the machine is conventional and its operation is well known in the art.

A stripper finger 210 is mounted immediately below the stack of catch cover sheets and adjacent to the right-hand edge of the stack as viewed in Figure 3. The finger is affixed to a bar 212 mounted for slidable movement transversely of the machine. The bar is actuated through an arm 214 the upper end of which is attached to the bar and the lower end of which is pivotally mounted on a fixed pivot. The bar 214 is oscillated about its pivotal mounting by the action of cam 220 acting upon cam follower 218 and working through suitable linkage 216. The cam 220 is mounted on the front longitudinal cam shaft 58 and is so positioned as to cause the stripper finger 210 to move toward the rear of the machine immediately after the lowermost catch cover sheet has been drawn downwardly out of the magazine by the action of the suction cup 80. The plate 66 which serves as a portion of the magazine supporting the catch cover sheets has mounted in the lower portion thereof a screw 211 which extends through the plate to a small extent and serves as a detent for holding the catch cover sheets in position in the magazine. The stripper finger 210 is so positioned and its action so synchronized with the action of the suction cup that as it moves transversely of the machine it moves between the catch cover sheet being moved downwardly by the suction cup and the remainder of the stack of catch cover sheets. The finger thus serves to strip the catch cover sheet away from the stack and to insure a withdrawal of the entire sheet below the detent screw 211.

Mounted below the spaced bars 8 is a conveyor slide bar 142. The slide bar 142 is adapted to slide between conveyor elevating rails 144. Mounted on the conveyor slide bar 142 are a plurality of cross plates 146 supporting upwardly extending fingers 148. The fingers 148 are adapted to extend through the slots between the spaced bars 8. The cross plates 146 rest upon the elevating rails 144. The elevating rails 144 are attached to a pair of vertically extending plates 150 and 152. The vertically extending plates are positioned transversely of the machine and have their lower ends slotted to fit over the left and right-hand main cam shafts, respectively. The plate 150 mounts a cam follower 154 which rides on the surface of a cam 156 mounted on the left-hand main cam shaft. The plate 152 mounts a cam follower 158 which is adapted to ride on the surface of a cam 160 mounted on the right-hand main cam shaft. Rotation of the cam shafts and action of the cams 156 and 160, which are adapted to provide simultaneous rise and fall of their respective cam followers, will cause the elevating rails 144 to rise and fall and thus cause the conveyor fingers 148 to rise and fall within the slots between the spaced bars 8.

Extending below the underside of the slide bar 142 is a clevis 162 which is attached to the slide bar and has pivotally mounted therein a push rod 164. The right-hand end of the push rod, as viewed in Figure 4, adjacent to the clevis 162 is provided with a shoulder, and a coil spring 166 which is positioned around the push rod 164 is adapted to engage the shoulder. A lever 168 is mounted on a pivot block 170 which is attached to the frame leg 2 at the left-hand end of the machine. The lever 168 above the pivotal mounting supports a cam follower 172 which is adapted to ride on the surface of a cam 174 affixed to the lower transverse cam shaft 42. The upper end of the lever 168 is in the form of a clevis and mounts a clevis pin 175 through which the rod 164 passes. The rod 164 is adapted to extend through a short tubular member 176 and the spring 166 engages the clevis pin 175. The left end of the rod 164 extending through the tubular member is provided with a pair of jam nuts 178 and thus the spring 166 is held in compression on the rod 164. Action of the cam 174 on the cam follower 172 causing the arm 168 to move in a clockwise direction about the pivot, as viewed in Figure 4, will drive the slide bar 142 to the right, as viewed in Figure 4, by force carried through the spring 166 and thus, if an obstruction prevents motion of the slide bar 142, the spring 166 will be compressed by the action of the cam 174 and no damage will occur to the machine. The lower end of the lever 168 below the pivotal mounting thereof is connected to one end of a return spring 180. The other end of the return spring which extends to the right, as viewed in Figure 4, from the lower end of the lever 168 is attached to a portion of the frame of the machine. This spring serves to hold the cam follower 172 in engagement with the cam 174 and to return the slide bar to the left, as viewed in Figure 4, after it has been moved to the right by the operation of the cam. Thus it will be apparent that both motions of the slide bar 142 are yieldingly driven and, in the event of any obstruction arising to the motion of the slide bar, the motion thereof may be arrested before rotation of the cam 174 is arrested.

The position of the rise of the cam 174 is so arranged with respect to the position of the rises of the cams 156 and 160 that the conveyor elevating rails 144 are in an upper position when the push rod 164 and the conveyor slide bar 142 are being moved to the right as viewed in Figures 1 and 4, whereas when the elevating rails are in a lowermost position, the slide bar is being moved to the left. Thus there is provided the repetitious movement of the conveyor fingers 148 to the right above the spaced bars 8 and a succession of catch cover sheets which have been deposited upon the spaced bars 8 by the operation of the suction cup 80 and the gripper arm and gripper jaws 120, as have been previously described, will be moved to the right along the conveyor in successive stages. The operations performed on the cover sheets in these successive stages will now be described.

A pair of depressor fingers 182 are positioned above the spaced bars 8 and are mounted on a transversely extending rotatably mounted shaft 184. The shaft is adapted to be rotated through linkages 186 by the action of a cam follower 188 engaging the surface of a cam 190 which is mounted on the front longitudinal cam shaft 58. The cam 190 is so positioned on the shaft 58 that the depressor fingers 182 are raised when the gripper jaws are moving to the right-hand position, as viewed in Figures 2 and 4, and are depressed as shown in Figures 2 and 4 after the catch cover is stripped from the gripper arm. The depressor fingers serve to press each catch cover sheet downwardly upon the spaced bars 8 when it is released by the gripper jaws and has engaged vertically extending stop plates 192 which serve to strip the sheet out of the gripper jaws. The fingers 182 hold each catch cover sheet down on the conveyor as it is moved away by the conveyor and under a plate 222 which will be described.

A bar 194 is positioned transversely of the machine above the top plate 6. The portion of the bar 194 extending toward the rear of the machine is positioned above the spaced bars 8 and extending above the conveyor fingers 148. The portion of the bar extending toward the front of the machine is attached to the top plate 6 in the region adjacent to the spaced bars 8. The bar 194 serves to support the pivotal mounting of the depression fingers 182 and the bracket 193 supporting the stop plates 192, and there is provided between the bar 194 and the spaced bars 8 sufficient space for the fingers 148 to carry the catch cover sheets beneath the bar 194.

A pusher bar 196 extending longitudinally of the spaced bars 8 of the conveyor is connected to a push rod 198 and is adapted to be moved thereby transversely of the conveyor. The pusher bar 196 is so positioned that it can act upon the catch cover sheets immediately after their deposition upon the conveyor to push the cover sheets toward the rear of the machine and cause the cover sheets to engage a rear guide plate 206. The pusher bar is actuated through the push rod 198 through suitable linkage 200 by the action of a cam follower 202 engaging a cam 204 mounted on the front longitudinal cam shaft 58. A fixed guide 195 is provided to raise the forward edge of each catch cover sheet to prevent it from getting caught under the pusher bar 196, and the face of the pusher bar is notched at 197 to engage the cover sheet as it pushes the cover sheet into position.

After the catch cover sheet has been deposited on the conveyor at the left-hand end thereof, as viewed in Figure 4, the first or left-handmost set of conveyor fingers 148 will rise adjacent to the left-hand ends of the spaced bars 8 through the spaces therebetween and to the left of the blocks 147 which are provided to prevent the cover sheet from sliding too far to the left after being stripped from gripper jaws 120. The conveyor fingers 148 carry the catch cover to the right, as viewed in Figure 4, to a position to the right of the left-handmost pair of conveyor fingers 148 shown in Figure 4. In this figure the conveyor fingers are shown in their advanced right-hand position prior to their depression and return stroke. When the catch cover is in this position, the lower fold, which is made about the fold line indicated at 19 in Figure 13, is made and the flap 31 is folded over the body or back portion of the cover sheet. The apparatus for making this fold may now be described.

A vertically moving blade 224 is slidably mounted and is adapted to ride through a slot 225 provided in a top plate 9. The blade is actuated by a vertically extending arm 226 the upper end of which is attached to the blade and the lower end of which mounts a cam follower 228 adapted to ride on the surface of a cam 230 affixed to the rear longitudinal cam shaft 60.

A horizontally moving blade 234 is positioned above the top plate 9 and is actuated by a pair of downwardly extending arms 236 which are pivotally mounted on the cam shaft 60. A cross bar 238 extending toward the front of the machine is pivotally connected at 239 to a cross bar 237 attached to and extending between the vertically extending arms 236 above the cam shaft 60. The cross bar 238 mounts a cam follower 240 adapted to engage the surface of a cam 242 mounted on the left hand main cam shaft 36.

The cams 230 and 242 are so formed as to provide first upward motion of the blade 224 which serves to bend the lower flap of the catch cover sheet around a fixed plate 222 extending from the rear end of the transversely extending bar 194. Thereafter, as the blade 224 commences its downward motion, the horizontally moving blade 234 moves to the right, as viewed in Figure 5, clearing the end of the receding blade 224 with a slight tolerance and forming the lower flap of the catch cover sheet around the fixed plate 222. A stop bar 199 is provided to prevent the cover sheet from moving forward or to the right as viewed in Figure 5 as the lower fold is made.

When this operation has been completed, the conveyor fingers 148 will have completed their motion to the left, as viewed in Figure 4, in a receded position, and will again rise up through the slots between the bars 8. The fingers 148' shown in Figure 4 will then engage the formed catch cover sheet and move it to the third station above the slotted bed plate which is the position to the right of the conveyor fingers 148' shown in Figure 4. In this position the cellophane tablet package 21 is inserted into the lower flap of the catch cover.

Extending above the top plate 6 is a magazine 244 adapted to retain a stack of cellophane tablet packages 21 such as are shown in the assembled catch cover of Figure 12. The magazine is provided with a pair of transverse rods 246 and a pair of adjustable screws 248 to support the stack of tablet packages at the edges thereof and to permit the removal of successive lowermost packages from the stack. A pair of suction cups 250 are connected through vacuum line 252, strainer 254 and vacuum line 256 to the control valve 94. The control valve 94 is connected to the vacuum reservoir 24 through the pipe line 96 as previously described.

The control valve 94 is actuated through linkage 258 and cam follower 260 by a cam 262 mounted on the rear longitudinal cam shaft 60.

The suction cups 250 are mounted on the upper end of a rod 264 slidably mounted in a bracket 265 attached to the front side plate 4. The lower end of the rod 264 is pivotally connected to a horizontally extending member 266 which is pivotally mounted at its forward end 268 and mounts a cam follower 270 which is adapted to be drawn into engagement with the surface of a cam 272 mounted on the front longitudinal cam shaft 58 by the action of a spring 251. The cam 272 is so formed as to permit the suction cups 250 to rise upwardly and engage the lowermost tablet package in the stack contained within the magazine and then to move downwardly and remove the lowermost package from the stack. The cam 262 is so formed as to actuate the vacuum control valve 94 to provide suction at the suction cups 250 only immediately before and during those intervals when a cellophane package is being carried downwardly thereby out of the magazine past the detent bars 246 and the detent screws 248.

Two spaced pairs of arcuately formed blades 274 are pivotally mounted on a block 276 by means of the pivot bar 278 affixed to the right-hand end of the arcuate blades 274 as viewed in Figure 6. The blades 274 are provided in the regions thereof adjacent to their left-hand ends, as viewed in Figure 6, with a cut away portion having an upper surface 280. The left-hand ends of the blades are formed with extending lugs or tips 282 at the upper and lower edges thereof. The block 276 is attached to an irregularly shaped arm 284 which is pivotally mounted at its lowermost end to a bracket 286 extending below the longitudinal support bars 26. The arm 284 mounts a cam follower 288 which engages the surface of cam 290 affixed to the left hand main cam shaft 36. The return spring 285 is connected between the arm 284 and a pin extending upwardly from the vacuum control valve 84. The action of the cam 290 on the cam follower 288 causes the arcuately formed blades 274 to move to the right, as viewed in Figure 6, and the return spring 285 will cause the blades to move to the left upon rotation of the cam 290. Thus the blades are caused to oscillate as the cam shaft 36 rotates.

Positioned between each of the pairs of arcuately formed blades 274 is a stationary bar 291 which is adapted to retain a blade 292. Each of the blades 292 is provided at its left hand end, as viewed in Figure 6, with a projecting upper corner 293. The blades 292 are pressed into slots in the stationary members 291 and may be adjustably positioned therein. The stationary members 291 are provided with a cut away left hand portion 294, as viewed in Figure 6, which extends above the slotted portion of the conveyor and provides clearance for movement thereunder of the catch cover sheets which are advanced by the conveyor fingers.

In the operation of the tablet package feed, the suction cups 250 draw the lowermost tablet package, as indicated at $a$ in Figure 15, downwardly out of the stack retaining portion of the magazine and deposit the package upon the arcuate upper surfaces of the blades 274, as indicated at $b$ in Figure 15. The arcuate blades 274 are then drawn backwardly or to the right, as viewed in Figures 6 and 15 and the tablet package is held in position on the blades 274 and prevented from moving to the right with the blades 274 by the plate 245 forming the back edge of the magazine. As the blades 274 move to their extreme right-hand position, as viewed in Figures 6 and 15, the tablet package drops down in the cut away portions of the arcuately formed blades and comes to rest upon the upper surfaces of the blades 292 as indicated at $c$ in Figure 15. Upon successive movement of the blades 274 to the left, the vertically extending edges 215 of the blades between the surfaces 274 and 280 will move the tablet package to the left as viewed in Figure 6 and the package drops from the surfaces 292 onto the surfaces 280 as indicated at $d$ in Figure 15. Upon the next successive motion of the arcuately formed blades to the right, the tablet package will catch against the edge 293 and be retained in its position until the surfaces 280 pass to the right of the package whereupon the package drops onto the surfaces 294 of the blades 292 in a position indicated at $e$ in Figure 15. Thereafter, upon the next successive motion of the arcuately formed blades 274 to the left, the tablet package will be advanced by the ends 282 of the extreme left-hand ends of the blades 274 and the tablet package will then be pressed forwardly through the position indicated at $f$ in Figure 15 and under a floating blade 296, shown in Figure 6, and into the bottom fold 31 of the catch cover sheet which has been positioned to receive the tablet package by the operation of the conveyor fingers 148' as shown in Figure 15.

The floating blade 296 is loosely mounted by screws on an extension of a side plate 299 which is an extension of the left side of the tablet package magazine as viewed in Figure 1. The plate 298 is an extension of the right-hand side of the tablet magazine as viewed in Figure 1. The plates 298 and 299 serve to guide the tablet package as it is pushed into the catch cover sheet.

A pair of blades 300 are positioned so that each blade falls between one of the pair of arcuately formed blades 274. The blades 300 are adjustably mounted on a cross bar 302 which is affixed to a bar 304 extending from a rod 306 which is rotatably mounted above the top plate 9. An arm 308 is attached to the rotatably mounted rod 306 mounted on a block 307 and the outer end of the arm 308 is pivotally connected to a downwardly extending link 310. The lower end of the link 310 carries a cam follower 312 which is adapted to engage the surface of a cam 314 affixed to the rear longitudinal cam shaft 60 as shown in Figure 4.

The contour and position of the cam 314 is such that the blades 300 are moved downwardly on top of each tablet package as the package drops from the surfaces 292 to the surfaces 280 with each left-hand movement of the blades 292 and as the package drops from the surfaces 280 to the surfaces 294 with each right-hand movement of the blades 274.

It should be noted that, while the arms 274 have an arcuate motion, the center of radius of this motion is the pivotal mounting on the bracket 286 which is positioned as far below the arms 274 as is conveniently possible. Thus the arms 274 have actually a substantially linear motion. In fact, there is no need for these arms to have an arcuate motion and their motion could equally well be linear in so far as the feeding operation performed thereby is concerned.

The block 307 is provided with a notch 309 on the forward side thereof which holds the flap 23 of the catch cover in position while the tablet package is being inserted therein.

An arm 316 extends transversely across and above the spaced bars 8 and has the rearward portion 322 thereof bent to extend longitudinally of the bars 8. The portion 322 carries a downwardly extending blade 324 positioned above the rear slot between the top plate 9 and the rear bar 8. The arm 316 is pivotally mounted on a stationary shaft 320 which is mounted above the top plate 6 and extends longitudinally of the machine. An arm 317 has its left-hand end, as viewed in Figure 1, affixed to the arm 316 and its right-hand end pivotally mounted on the shaft 320. The arms 316 and 317 are adapted to slide in a longitudinal direction on the shaft 320.

A blade 326 is positioned in and extends downwardly from the slot between the top plate 9 and the rear bar 8 and is positioned immediately below the blade 324. The blade 326 is affixed to a cross bar 330 which rests upon a roller 332 adapted to roll on a track 334 affixed to the rear frame plate 4. The bar 330 is irregularly formed and is connected at its forward end to a block 336 which has two upwardly extending portions 337 which are bored at their upper ends and are slidably mounted on the longitudinal shaft 320 between and in contact with the arms 316 and 317. An irregularly shaped arm 338 extends downwardly from and is pivoted to the block 336 and is pivotally attached to the upper end of a vertically extending link 340.

The lower end of the link 340 is affixed to a transversely extending rod 342 which is pivotally mounted in the frame of the machine. An arm 344 attached to the shaft 342 and extending upwardly therefrom is actuated by a tubular member 346 pivotally connected thereto at 348. A horizontally extending rod 350 is slidably mounted in the tubular member 346 and has affixed to its right hand end, as viewed in Figure 2, a short vertically extending plate 352. The left hand of the rod 350 mounts a cam follower 354 which is adapted to be actuated by the cam 356 mounted on the lower transverse cam shaft 42. A coil spring 358 is positioned around the rod 350 and is retained between the shoulder provided by the left hand end of the tubular member 346 and a collar 360 affixed to the rod 350. Thus rotation of the cam 356 will actuate the cam follower 354 causing the rod 350 to move to the right, as viewed in Figure 2, and causing the tubular member 346 to be urged to the right by the action of the spring 358, thus moving the arm 344 to the right as viewed in Figure 2.

The return travel of the arm 316 and the arms 340 and 344 is effected by a pair of springs 362 the right hand ends of which, as viewed in Figure 2, are attached to the plate 352 and the left hand ends of which are attached to a fixed rod 364 which is attached to the left hand frame legs 2 of the machine. It will be evident that the arrangement just described provides for yielding motion of the arm 316 and the blade 324 positioned above the conveyor and the arm 330 and the blade 326 positioned below the conveyor in both directions of their travel as controlled by the springs 358 and 362.

The arm 316 has a forwardly and downwardly extending portion 400 the lower end of which mounts a follower 402. The member 402 is mounted within a track 404 contained within a longitudinally extending member 406 which is pivoted at its right hand end as viewed in Figure 2 on the frame of the machine. The left hand end of the member 406 is engaged by the lower end of a vertically extending member 408 which is pivotally mounted to the upper plate of the machine at 409. The member 408 carries a cam follower 410 which engages a surface of a cam 412 affixed to the front longitudinal cam shaft 58. A return spring 414 is connected between the frame of the machine and the left hand end portion of the pivotally mounted track member 406.

In operation of the machine the cam 412, the track bar 406 and the arm 400 of the arm 316 serve to raise or lower the blade 324, and the cam 356 acting through the rod 350 and the arms 344 and 340 serve to move the arm 316 and the blade 324 and the arm 330 and the blade 326 longitudinally of the machine. It will be evident that by properly synchronizing these motions the blades 324 and 326 may be adapted to grip the catch cover flap 31 after the cellophane tablet package has been inserted therein and to move the catch cover from the tablet package insertion station to the next station on the conveyor. The next station on the conveyor, as will be described, is the heat sealing station. Included in this station is means for marking a serial number or other suitable indicia on the catch cover. In order to insure the placement of this serial number in a central location on the lower flap of the catch cover, it is necessary to accommodate for various widths of catch covers and conveyor means other than the conveyor pusher fingers 148 are provided. It will be evident that the pusher fingers 148 will always position the rear edge of the catch cover in identical positions, but if catch covers of various widths are employed, the central portion of the bottom flap would not always align itself with indicia marking means provided in the heat sealing apparatus. For this reason the clamping blades 326 and 324 are provided to advance the table package from the cellophane tablet package insertion station to the heat sealing station. The degree of this advance may be readily adjusted by adjusting the position of the pivotal connection 348 in the slot 345 in the arm 344. It will be evident that, as the location of the pivot 348 is moved with respect to the center of radius 342, the degree of travel of the clamping blades 324 and 326 may be adjusted in order to center the catch cover in the heat sealing apparatus which will now be described.

A block 416 is attached to the rear frame member 4 and spaced therefrom by a suitable heat insulating plate 416' with the upper edge of the block flush with the surface of the top plate. A similar block 418 is supported by means of an arm 422 immediately above the block 416. The blocks 416 and 418 are both provided with conventional heating elements and are each adapted to mount clamping bars 419 supporting suitable indicia bearing type 421 as indicated generally in the cut away region 420 which extend for only a portion of the length of the block. The arm 422 is pivotally mounted on a pivotally mounted shaft 424. Rigidly mounted on the shaft 424 is an arm 426 which lies immediately adjacent to the arm 422. The arm 422 is provided with a lug 438 attached thereto and through which extends a bolt 430 which passes into the arm 426. An arm 432 extending generally downwardly from the shaft 424 is rigidly attached to the arm 426 and shaft 424. The arm 432 carries at its lower end a cam follower 434 which is adapted to engage a cam 436 mounted on the left-hand main cam shaft 36. Rotation of the cam shaft 36 will actuate the arms 432 and 426 and rotate the arms about the axis of shaft 424 and will carry therewith the arm 422. Thus rotation of the cam 436 will cause the upper block 418 of the heat sealing arrangement to press downwardly against the lower block 416 and, when a catch cover assembly has been carried with the lower flap of the assembly positioned between the blocks 418 and 416 by the action of the blades 324 and 326 as previously described, the forward areas of the heated blocks 416 and 418 which are pressed together thereagainst will heat seal the cellophane tablet package in the lower flap of the catch cover in the region indicated at 23 in Figure 12 and the type 421 will provide an indicia indicated generally at 25 in Figure 12. The upper block 418 is attached to the arm 422 by means of sliding bolts 423 and compression springs 425 in order that, in the lowermost position of the block 418 as provided by the action of the cam 436, a yielding pressure is provided against the lower flap of the catch cover without providing undue strain upon the apparatus. In the heat sealing operation, heat from the blocks 416 and 418 passes through both the flap and the back of the catch cover heat sealing the tablet package to both of these portions of the catch cover sheet.

Replacement of the indicia printing dies is accomplished by removing the bolt 430 and hinging back the arm 422 carrying the upper block 418. This block may then be rotated backwardly until it and the arm 422 assume the positions indicated at 422' and 418', respectively. During operation of the machine it will be evident that the cam 436 is so positioned as to cause the heat sealing blocks to come together each time a catch cover has been positioned therebetween and to provide for separation of the heat sealing blocks by a return spring 433 to permit the conveyor fingers 148", Figure 4, to carry a heat sealed catch cover assembly out of the heat sealing means and to permit the blades 324 and 326 to carry the next catch cover into position between the heat sealing means to be heat sealed. The release by blades 324 and 326 is timed to occur after clamping by the heat sealing blocks to insure maintenance of alignment of the tablet package in the cover sheet.

The next operation accomplished by the machine is the folding of the upper flap 29 of a catch cover down over the front of a package and tucking this flap under the upstanding edge of the lower flap 31.

A fixed guide member or folding bar 440 is supported by an arm 442 extending forwardly from the rear of the machine and attached at its rear end to the top plate 9 of the machine. The member 440 is positioned above the conveyor with sufficient clearance to allow the catch covers to pass between it and the conveyor. A flexible spring finger 444 is attached to the underside of the guide member 440 and extends outwardly therefrom to the right of the machine as viewed in Figure 1. A vertically sliding blade 446 is positioned adjacent to the guide member 440 and is adapted to rise upwardly through a slot in the top plate 6. A similar blade 448 is also positioned beside the guide member 440 and adjacent to the blade 446 to the right thereof, as viewed in Figure 1.

A horizontally extending bar 450 is attached to the blade 448 adjacent to the lower edge thereof and extends to the left of the machine as viewed in Figure 10. A vertically extending bar 452 has its upper end attached to the left-hand end of the bar 450. A cam follower 454 is attached to the lower end of the bar 452 and is adapted to ride on a cam 456 affixed to the main right-hand cam shaft 38. The blade 446 has attached thereto the upper end of a vertically extending rod 458. The cam follower 460 is attached to the lower end of the rod 458 and is adapted to ride on a cam 462 attached to the main right-hand cam shaft 38. Also attached to the rod 458 is a member 464 which is adapted to engage the lower edge of the bar 450 attached to the blade 448. The cams are so arranged that both blades rise together by the operation of cam 462 but the blade 446 is dropped independently and ahead of blade 448 by cam 462 and the blade 448 is dropped later by the cam 456.

A guide bar 364 is adjustably mounted on the rear top plate 9 by means of a screw 366. A guide bar 368 is mounted on the top plate 6 opposite of the guide bar 364. These two guide bars may be so positioned as to align the upper edge of a catch cover sheet of any size to be folded about the bend line 27 by the blades 446 and 448 and the guide 440 as has been described.

In the operation of the machine, the blades 446 and 448 will rise upwardly after a catch cover comes to rest thereover and engage the underside of a catch cover sheet at a location immediately above the fold line 27 indicated in Figures 12 and 13. As the conveyor carries each successive catch cover past the blades 446 and 448, the blades 446 and 448 rise upwardly bending the upper flap of the catch cover upwardly at 90 degrees with respect to the top of the top plate and around the stationary guide 440. As the catch cover is moved to the right, as viewed in Figure 10, the left-hand blade 446 will drop downwardly to permit the next catch cover to start into position while the blade 448 remains in an upward position in order to hold the upper flap of the catch cover in a vertical position as it is started under the means for tucking the upper flap down under the lower flap. This means is indicated generally at 472 in Figure 9.

A fixed guide member 466 is mounted on the upper surface of a guide bar 468. The guide bar 468 extends from approximately the front or under the tucking apparatus, indicated generally at 472, to the extreme right-hand end of the machine as viewed in Figure 1. The guide member 466 holds the 90° formed flap in a bent over position prior to the tucking operation. A fixed guide bar 364 is attached to the top plate 9 at the rear side of the conveyor to provide a guide for the lower edge of the catch cover assemblies to position the assemblies prior to their being folded into a closed position. A guide bar 469 guides the closed assemblies from beyond the end of guide bar 364 as they are carried to the end of the conveyor.

A raised rib 470 is provided on the surface of the rear bar 8 in the region thereof where the upper flap of the catch cover is tucked under the lower flap thereof and so positioned that the upper portion of the lower flap passes thereover as the catch cover is carried along the conveyor. A plate 471 having a downwardly turned flange 474 is positioned above the top plate 9 and to the rear of the raised rib 470. The plate 471 is supported by an arm 476 which extends downwardly and is adjustably attached to a horizontally extending arm 478 which is in turn mounted on the plate 152 which actuates the conveyor elevating rail. Thus when the conveyor fingers are depressed, the downwardly turned flange 474 is in a downward position and, when the conveyor is raised and the fingers are moving catch covers along the conveyor, the flange 474 will be in an upward position as shown in Figure 9. When the catch covers are being carried along the conveyor, a cover will come to rest over the rib 470 and the flange 474 will be carried downwardly and engage the left-hand or lowermost portion of the catch cover causing the lower edge of the flange of the catch cover to be bent down around the rib 470 and causing the edge of the flange indicated by numeral 31 in Figure 12 to stand up to permit the entry of the upper flap under the flange by the operation of the flap folding mechanism indicated generally at 472 as will now be described.

A stirrup member 480 is attached to a rotatably mounted shaft 482 and supports between the upstanding legs thereof a block 484 having an arcuately formed surface 486. A second stirrup member 487 is rotatably mounted on the shaft 482 and is urged to rotate around the shaft 482 in a counterclockwise direction, as viewed in Figure 9, by a spring 488 coiled around the shaft 482. The upper extending arms of the stirrup member 487 are adapted to support a metal plate 490 having a downwardly extending edge 492 extending over and below the lowermost edge of the arcuate surface 486 of the block 484.

Affixed to the shaft 482 is a gear 494 which is adapted to be driven by a segment gear 496 which is fixed on a shaft 498 rotatably mounted within the machine frame. An arm 500 is attached to the shaft 498 and mounts at the lower end thereof a cam follower 502 which is adapted to ride on the surface of a cam 504 mounted on the right-hand main cam shaft 38. A return spring 506 is attached to the arm 500 and to a portion of the frame of the machine and is provided to urge the cam follower into engagement with the cam 504. An adjustable stop rod 508 is attached to a fixed arm 510 which is attached to the frame of the machine and is provided to limit the travel of the arm 500 as effected by the spring 506 and thus to limit the extent to which the flap tucking apparatus, indicated generally at 472, is lowered in a tucking operation.

In operation of this portion of the apparatus, a catch cover is carried into position by the conveyor fingers 148 and comes to rest momentarily over the rib 470 and under the tucking apparatus indicated generally at 472. With the catch cover assembly in this position, the plate 471 and the flange 474 thereof are moved downwardly bending the lower portion of the catch cover over the rib 470 and causing the lower flap 31 of the catch cover to open partially to permit the insertion of the upper flap of the catch cover thereunder. The cam follower 502 and the gear assembly 494 and 496 are then actuated by cam 504 and the two stirrup members 487 and 480 are rotated and the block 484 and the metal plate 492 are moved downwardly. A spring leaf 512 is attached to the stirrup members 480 and moved downwardly with the block 484 and the plate 492.

As these two latter members carry the upper flap of the catch cover downwardly around the spring leaf 444, the edge 29 of the flap will slide across the arcuate surface 486 and engage the plate 492. The plate 492 is so positioned that in its downwardmost position it just clears and is lower than the upper edge of the lower flap 31 which is held open by the action of the flange 474 and the rib 470 previously described. When the plate 492 has reached this position, further downward travel thereof is arrested by the contact of an arm 514 which extends downwardly from the stirrup member 487 and under the top plate 6 with an adjustable stop screw 516 extending through the top plate 6. After the arrest of further downward travel of the plate 492, the block 484 continues to move downwardly and serves to press the lower edge of the catch cover flap downwardly and out from below the lower edge of the metal plate 492 whereupon this edge of the catch cover, indicated at 29 in Figure 12, slides under the lower flap 31 of the catch cover as a result of its own spring tension and as a result of the pressure of the leaf spring 512 bearing downwardly upon the upper flap. The flap folding apparatus, indicated generally at 472, is then caused to rise upwardly as a result of continued rotation of the cam 504 and the conveyor fingers again rise and carry the folded catch cover to the next position on the conveyor.

A depressor bar 517 is attached to an arm 519 which is affixed to the right-hand arm of the stirrup member 480 as viewed in Figure 1. Thus each time the flap tucking apparatus is depressed, the depressor bar 517 will be moved downwardly toward the conveyor. Downward motion of this bar will cause the bar to engage a previously closed catch cover assembly and thus serve to press down the tucked-in flap and insure the complete insertion thereof under the lower flap.

A cam 700 is mounted on the rear cam shaft 60. A generally vertically extending rod 702 has a forked lower end 704 which is slidably mounted over the cam shaft 60 and carries a cam follower 706 adapted to ride over the surface of the cam 700. The upper end of the rod 702 is pivotally connected to the back end of an irregularly shaped arm 708. The forward end of the arm 708 is attached to a shaft 710 which extends longitudinally of the machine and is rotatably mounted in a sleeve 712 which is supported in a fixed position by a bracket 714 bolted to the top plate 9. A forwardly and generally downwardly extending arm 716 is affixed to the right-hand end of the shaft 710 and has attached to its forward end a longitudinally extending wire 718 which extends to the right of the arm 716 as viewed in Figure 1. This wire is so positioned as to fall between the upper flap tucking apparatus 472 and the flange 474 which acts to open the lower flap to receive the tucked upper flap.

When catch cover sheets of the type shown in Figures 12 and 13 are employed, the inner folded portion 17 of the cover sheet occasionally assumes a downwardly bowed position during the flap tucking operation when the upper or outer portion of the upper flap of the catch cover bows upwardly under the arcuate surface 486 of the block 484 associated with the flap tucking apparatus 472. It will be evident that, if this inner flap portion 17 bows downwardly, it will prevent the edge 29 of the catch cover flap from being inserted under the lower flap 31. The cam 700 is formed and positioned on the cam shaft 60 so as to raise the wire 718 during the first portion of a tucking operation so that, as the upper flap of a catch cover is folded downwardly by the tucking apparatus, the wire 718 will press the inner flap portion 17 of the catch cover upwardly against the arcuate under-surface of the block 484 and thus prevent the inner flap portion 17 from bowing downwardly and interfering with the tucking operation. As the edge 29 of the upper flap approaches the lower flap 31, the cam 700 will have assumed a position in which the cam follower 706 has risen out of the fall of the cam, thus lowering the wire 718 so that it lays at rest within the folded catch cover assembly and thus does not serve to open the catch cover assembly as the flap tucking apparatus 472 is raised and as the closed catch cover assembly is moved away from the tucking apparatus to the depressor bar 517.

As the assembled catch covers pass down the conveyor, they pass under finger 518 which is mounted on a rod 522 rotatably supported in a bracket 520 which serves to hold the finger in a position above the conveyor so that the outer end thereof rests upon one of the bars 8 and is raised each time an assembled catch cover passes thereunder. The rear end of the rod 522 is attached to the upper end of a downwardly extending bar 524. The lower end of the bar 524 is pivotally connected to one end of a horizontally extending bar 562. The other end of the bar 562 is pivotally connected to the lower end of a vertically extending link 564 which is in turn pivotally connected at its upper end to a bar 566 the lower end of which is attached to the member 478.

A counter-register 568 is positioned above the top plate 9 and has its actuating arm povotally connected to a downwardly hanging arm 570, the lower end of which is provided with an enlarged diameter portion 572. The bar 562 previously described is provided with a bore 574 through which the rod 570 and the enlarged portion 572 thereof are adapted to pass when the finger 518 is at rest upon the bar 8. When a catch cover assembly is passed under the finger 518 and thus raises the finger from the surface of the bar 8, the effect will be to move the bar 562 to the left, as viewed in Figure 11, and to displace the bore 574 from above the enlarged portion 572 of the rod suspended from the conveyor. As previously described, the arm 478 rises and falls with each advance of the conveyor, and thus with each fall of the arm 478 the register 568 is actuated to add one count when there is a tablet package under the finger 518. On the other hand, if there is no package under the finger 518, the hole 574 in the strap 562 is in alignment with the enlarged portion 572 of the shaft 570 and no count takes place upon operation of the bar 478.

Referring to Figure 1 there is shown generally at 578 a controller 580 and a temperature indicator 582 employed in conjunction with the heating elements in the heat sealing apparatus previously described. This apparatus is entirely conventional and need not be described in detail.

A master control switch 584 is mounted on the front frame plate 4. This switch supplies electrical power to the vacuum pump motor 12 and to the remainder of the apparatus as will be described.

The motor 28 is controlled by means of a start and stop switch 586. The start button of the switch 586 is actuated by means of a lever 588 which is extended upwardly through the top plate of the machine. The stop switch of the switch assembly 586 is actuated by means of a stop bar 590 which is mounted on a longitudinally extending shaft 592. The shaft 592 is pivotally mounted below the top plate of the machine and has affixed thereto a downwardly extending arm 594 which is adapted to actuate the stop button of the switch 586. A conventional motor starter 596 is connected by means of conduit 595 to the control switch 584 and start and stop switch 586. The electrical connections between the start and stop switch 586 and the motor starter 596 and the motor 28 are entirely conventional and need not be described in detail herein.

In addition to the start and stop switch 586, however, two other stop controls are provided for actuating the motor starter 596 to deenergize the motor 28. These two emergency controls may now be described.

A roll 600 is mounted on top of the machine adjacent to the left-hand end of the machine as viewed in Figure 4. Positioned above this roll is a roll 602. These two rolls are so positioned that each catch cover withdrawn from the catch cover magazine is carried therebetween. The roll 602 is mounted on an arm 604 pivotally mounted on the frame of the magazine. Also attached to the arm 604 is an upwardly extending rod 606 having at the upper end thereof a notch 608. A downwardly extending rod 610 having its lower end in the form of a knife edge is adapted to engage the upper end of the rod 606 when a single catch cover is positioned between the rolls 600 and 602. If more than one catch cover is positioned between these rolls, the upper end of the rod 606 will be displaced to the left of the arm 610, as viewed in Figure 4, and if less than one catch cover is between the rolls, the upper end of the arm 606 will be positioned to the right of the arm 610 as viewed in Figure 4. In the particular phase of the operation shown in Figure 4, a stud 614 attached to the upper end of the rod 606 is in engagement with the shaft 126 and the arm 606 is moved to the left out of its normal position thereby. However, during the phase of the operation when a catch cover is being drawn between the rollers, the rollers may be drawn into engagement with each other by the action of the spring 612 and, when separated to only the degree of separation resulting from the passage of a single catch cover therethrough, the upper end of the rod 606 will be immediately below the lower end of the member 610 as previously described.

The member 610 is attached to a block 611 which is rotatably mounted on a shaft 616 extending transversely of the machine and having at its front or right hand end, as viewed in Figure 3, suitable linkage 618 and 620 connected thereto which is in turn actuated by a cam follower riding on the surface of cam 622 attached to the right hand end of the upper transverse cam shaft 56. A spring 613 urges the block 611 to rotate around the shaft 616 in a clockwise direction as viewed in Figure 4. This rotation is prevented by a member 615 which is fixed to the shaft 616 and has an extended portion thereof in interengagement with a mating extended portion of the block 611. Thus the spring 613 will cause the block 611 to rotate when permitted to do so by rotation of the shaft 616 and, additionally, by misalignment between the upper end of the rod 606 and the lower end of the member 610.

Mounted on the shaft 616 and attached to the block 611 is a downwardly extending screw 624 which is positioned above and out of contact with a stationary insulated block 626. When the machine is in operation, as a result of the action of the cam 622 the shaft 616 will be rotated in a clockwise direction, as viewed in Figure 4, during that period when a catch cover should be passing between the roller 602 and 600. Thus the member 610 is moved downwardly by the spring 613 and the screw 624 moved downwardly therewith. If the upper end of the rod 606 is not beneath the member 610, the screw 624, will move downwardly and contact the upper surface of the block 626. If there is a single catch cover between the rollers 602 and 600, this contact cannot take place.

An electrical relay is connected to the screw 624 and block 626 in such a manner that the coil of the relay is energized when contact is made at these points and, as a result of operation of the relay, the driving motor 28 of the machine will be deenergized. The value of this safety control will be apparent when it is considered that, if a catch cover is not fed to the machine, a tablet package will subsequently be delivered to a location on the conveyor in which a catch cover does not exist and the result of this will be a jamming of the machine. Similarly, if more than one catch cover is fed simultaneously to the conveyor, an improper operation would obviously result.

An additional safety feature is provided in the form of a contacting mechanism associated with the cellophane tablet package feeding operation shown in Figure 6. A group of wire fingers 630 are pivotally mounted at 632 to the tablet package magazine. The weight of the fingers cause them to fall downwardly to the left as viewed in Figure 6. The outer ends of the fingers 630 are adapted to engage a metal plate 634 which is positioned between the members 294 and supported above the conveyor by means of an insulated block 636. It will be evident that these fingers 630 will contact the block 636 only when no tablet package is being fed therethrough and normally only during those brief intervals between the feed of successive tablet packages.

In conjunction with this contacting apparatus, a pair of contacts 640 are mounted on an insulated block attached to one of the transverse bars 64 shown in Figure 3. A movable bar 642 is insulated from ground and attached to an arm 644 which is affixed to a shaft 646 pivotally mounted on the arms 62, as viewed in Figure 2. The shaft 646 is connected by suitable linkage 648 to a cam follower 650 which is adapted to roll on the surface of a cam 652 attached to the upper transverse cam shaft 56. The movable bar 642 is actuated by the cam 652 to engage the contacts 640 and to provide an electrical circuit therebetween.

The two contact blades 640 are connected in series between a suitable relay and the fingers 630. The relay is connected to power through the switch 584. The cam 652 is so contoured as to provide a contact between the contact blades 640 and the movable bar 642 only during those periods of the operation of the machine during which a tablet package should be positioned between the wire members 630 and the plate 634. Thus, if during this phase of operation no tablet package is in position between the fingers 630 and the plate 634 as a result of the failure of the tablet package feed apparatus below the tablet package magazine, a circuit is established through this contact point and the contact blades 640 serving to energize the relay the actuation of which results in de-energization of the driving motor 28 and operation of the machine is thereby immediately arrested.

The relay connected with the cover sheet contacts 624 and 626, and the relay connected with the tablet package contacts 640 and 642 and 630 and 634 each have contacts connected, for example, in series with the stop button contact in the stop start switch 586 and operation of either of the emergency stop relays will operate the motor starter 596 to arrest the operation of the motor 28. Such motor circuits are well known to the art.

A limit switch 587 responsive to cam 587' is provided with contacts connected to operate in parallel with the manually operated stop circuit contacts previously mentioned to prevent the machine from stopping with the heat seal blocks 416 and 418 in closed position.

Reviewing briefly the operation of the apparatus, from the foregoing it will have become evident that a stack of catch covers, indicated by the construction lines 13 in Figure 1, will be positioned in the catch cover magazine and a stack of cellophane tablet packages 21 will be positioned in the tablet package magazine 244. When the machine is in operation, successive catch covers will be removed from the bottom of the stack of covers and deposited upon the conveyor whereupon they will be carried forward to the successive stations in the machine by the conveyor apparatus. In the first station on the conveyor the catch covers are positioned thereon by the pusher bar 196. In the second station on the conveyor, the lower fold 19 of the catch cover is produced. In the third station on the conveyor the cellophane tablet packages are delivered successively from the tablet package magazine and are positioned within the lower fold of the catch cover. In the fourth position on the conveyor the bottom fold of the catch cover is heat sealed with the cellophane tablet package in position therein. In the fifth position on the conveyor the cover sheet is positioned with respect to the apparatus for making the upper fold. In the sixth position on the conveyor the upper fold is made in the catch cover. In the seventh position the upper flap of a catch cover is tucked under the lower flap. In the eighth position the tucked-in flap is pressed downwardly to insure the complete insertion thereof under the lower flap. In the ninth position the completed catch cover assemblies are counted. Thereafter, the catch covers are discharged from the machine by the conveyor and are permitted to fall into any suitable receptacle or on another conveyor.

The catch cover sheet shown in Figure 13 is initially provided with a portion 17 which is folded over upon the portion 29. This extra portion is provided to afford surface area upon which may be printed instructions or information concerning the tablets contained within the package. It will be evident that it is not essential that this flap be included. However, the inclusion of the flap makes particularly desirable the operation of the stripping finger 210 in order to make certain that the flap 17 is carried downwardly with the catch cover sheet as it is fed out of the machine.

It will be evident from the foregoing description of the apparatus disclosed herein that the apparatus may be variously adjusted to accommodate catch cover sheets of various sizes and that tablet packages of suitable size and formed from any well known heat sealing material may be inserted therein.

It will also be evident that the apparatus disclosed herein is not limited in its use to inserting a tablet package into a folded cover. The apparatus may be used as inserting apparatus for inserting any of numerous types of articles into a cover sheet and thereafter folding the cover sheet around the article. This and other modifications may be made in the details of the apparatus disclosed herein without departing from the scope of the invention as set forth in the following claims.

What is claimed is:

1. Inserting apparatus for inserting an article into a cover sheet comprising means for making a lower fold in a cover sheet and inserting a portion of an article therein, means for heat sealing portions of the cover sheet adjacent to the fold to the portion of the article contained therein, means for making an upper fold in the cover sheet and tucking the upper edge of the upper folded portion of the cover sheet under the upper edge of the lower folded portion of the cover sheet, means for advancing cover sheets successively to each of said means, means containing a stack of cover sheets, means including a vacuum cup and a generally horizontally moving member for feeding successive cover sheets from the stack to said first mentioned means, means containing a stack of articles, means including a vacuum cup and a generally horizontally moving member for feeding successive articles from the stack to said first mentioned means, and means for actuating each of said means.

2. Inserting apparatus for inserting an article into a cover sheet comprising means for making a lower fold in a cover sheet, means for inserting a portion of an article into said lower fold, means for heat sealing portions of the cover sheet adjacent to the lower fold to the portion of the article contained therein, means for making an upper fold in the cover sheet, means for tucking the upper edge of the upper folded portion of the cover sheet under the upper edge of the lower folded portion of the cover sheet, means for advancing cover sheets successively to each of said means, means containing a stack of cover sheets, means including a generally horizontally moving carrying member for feeding successive cover sheets from the stack to said advancing means, means containing a stack of articles, means including a vacuum cup and a generally horizontally moving member for feeding articles from the stack to said article inserting means, and means for actuating each of said means.

3. Inserting apparatus for inserting an article into a cover sheet comprising means for making a lower fold in a cover sheet and inserting a portion of an article therein, means for heat sealing portions of the cover sheet adjacent to the fold to the portion of the article contained therein, means for making an upper fold in the cover sheet and tucking the upper edge of the upper folded portion of the cover sheet under the upper edge of the lower folded portion of the cover sheet, means for advancing cover sheets successively to each of said means, means for feeding successive cover sheets to the first mentioned means, means including a generally horizontally moving member having a stepped upper surface for feeding successive articles through a succession of positions to the first mentioned means, and means for actuating said means.

4. Inserting apparatus for inserting an article into a cover sheet comprising means for making a lower fold in a cover sheet and inserting a portion of an article therein, means for heat sealing portions of the cover sheet adjacent to the fold to the portion of the article contained therein, means for making an upper fold in the cover sheet and tucking the upper edge of the upper folded portion of the cover sheet under the upper edge of the lower folded portion of the cover sheet, means for advancing cover sheets successively to each of said means, means containing a stack of cover sheets, means including a vcauum cup and a generally horizontally moving member for feeding successive cover sheets from the stack to said advancing means, means containing a stack of articles, means including a vacuum cup and a generally horizontally moving pushing member for feeding successive articles from the stack to said article inserting means.

5. Inserting apparatus for inserting an article into a cover sheet comprising means for making a lower fold in a cover sheet and inserting a portion of an article therein, means for heat sealing portions of the cover sheet adjacent to the fold to the portion of the article contained therein, means for making an upper fold in the cover sheet and tucking the upper edge of the upper folded portion of the cover sheet under the upper edge of the lower folded portion of the cover sheet, means for advancing cover sheets successively to each of said means, means for feeding successive cover sheets and articles to the first mentioned means, means for actuating each of said means, and means for sensing the passage of cover sheets and articles and for arresting operation of the actuating means upon failure of the feeding means to properly feed a cover sheet and an article.

6. Inserting apparatus for inserting an article into a cover sheet comprising means for making a lower fold in a cover sheet and inserting a portion of an article therein, means for heat sealing portions of the cover sheet adjacent to the fold to the portion of the article contained therein, means for making an upper fold in the cover sheet and tucking the upper edge of the upper folded portion of the cover sheet under the upper edge of the lower folded portion of the cover sheet, yieldingly driven means for advancing cover sheets successively to each of said means, means for feeding successive cover sheets and articles to the first mentioned means, and means for actuating each of said means.

7. Inserting apparatus for inserting an article into a cover sheet comprising means for making a lower fold in a cover sheet, means for inserting a portion of an article into the fold, means for heat sealing portions of the cover sheet adjacent to the fold to the portion of the article contained therein and for marking indicia on each sealed article, means for advancing cover sheets successively to each of said means including means for adjusting the degree of advance of a cover sheet having an article inserted into the lower fold thereof from the inserting means to the marking means, means for feeding successive cover sheets and articles to the first mentioned means, and means for actuating each of said means.

8. Inserting apparatus for inserting an article into a cover sheet comprising means for making a lower fold in a cover sheet, means for inserting a portion of an article into the fold, means for heat sealing portions of the cover sheet adjacent to the fold to the portion of the article contained therein, means for advancing cover sheets successively to each of said means, means for feeding successive cover sheets to said lower fold making means, means for feeding successive articles to said article inserting means, and means for actuating each of said means, said means for making the lower fold including a fixed member extending over a portion of the cover sheet and around which the lower fold is made, a vertically moving member for raising the portion of the cover sheet to be folded adjacent to the edge of said fixed member, a horizontally moving member for bending the raised portion of the cover sheet over said fixed member, and said actuating means including means for first raising the vertically moving member and, thereafter, moving the horizontally moving member over the fixed member as the vertically moving member is lowered out of the path of the horizontally moving member.

9. Inserting apparatus for inserting an article into a cover sheet comprising means for making a lower fold in a cover sheet, means for inserting a portion of an article into the fold, means for heat sealing portions of the cover sheet adjacent to the fold to the portion of the article contained therein, means for advancing cover sheets successively to each of said means, means for feeding successive cover sheets to said lower fold making means, means for feeding successive articles to said article inserting means, and means for actuating each of said means, said article feeding means including means containing a stack of articles, means for moving successive articles from the bottom of the stack, and means for pushing the successively removed articles from their removed position into position in the lower fold of successive cover sheets.

10. Inserting apparatus for inserting an article into a cover sheet comprising means for making a lower fold in a cover sheet, means for inserting a portion of an article into the fold, means for heat sealing portions of the cover sheet adjacent to the fold to the portion of the article contained therein, means for advancing cover sheets successively to each of said means, means for feeding successive cover sheets to said lower fold making means, means for feeding successive articles to said article inserting means, and means for actuating each of said means, said article feeding means including means containing a stack of articles, means for removing successive articles from the bottom of the stack, an oscillating member having a stepped upper surface, said oscillating member upon successive movements in one direction moving a removed article to an intermediate position and from said intermediate position into position in said lower fold of a cover sheet, and means for depressing the articles in said intermediate position.

11. Inserting apparatus for inserting an article into a cover sheet comprising means for making a lower fold in a cover sheet and inserting a portion of an article therein, means for heat sealing portions of the cover sheet adjacent to the fold to the portion of the article contained therein, means for making an upper fold in the cover sheet, means for tucking the upper edge of the upper folded portion of the cover sheet under the upper edge of the lower folded portion of the cover sheet, means for advancing cover sheets successively to each of said means, means for feeding successive cover sheets and articles to the first mentioned means, and means for actuating each of said means, said upper fold making means including a guide member extending over a portion of the cover sheet and having an edge against which the cover sheet is folded and a pair of vertically moving members having adjacent ends and each having a side adjacent to an edge of the guide member against which the cover sheet is folded, and said actuating means including means for raising said pair of vertically moving members substantially simultaneously to make said upper fold and for lowering a first of said vertically moving members before the second of said vertically moving members to permit the entry of an unfolded cover sheet under said guide member while the formed cover sheet is moved out from under said guide member with the upper fold held in position by the second of said vertically moving members.

12. Inserting apparatus for inserting an article into a cover sheet comprising means for making a lower fold in a cover sheet and inserting a portion of an article therein, means for heat sealing portions of the cover sheet adjacent to the fold to the portion of the article contained therein, means for making an upper fold in the cover sheet, means for tucking the upper edge of the upper folded portion of the cover sheet under the upper edge of the lower folded portion of the cover sheet, means for advancing cover sheets successively to each of said means, means for feeding successive cover sheets and articles to the first mentioned means, and means for actuating each of said means, said tucking means including means for carrying the upper edge of the upper folded portion of the cover sheet to a position adjacent to the inside of the upper edge of the lower folded portion of the cover sheet and means for releasing the upper edge of the upper folded portion of the cover sheet from the carrying means when the upper edge of the upper folded portion of the cover sheet is in said adjacent position, the spring action of the upper folded portion of the cover sheet then urging the edge thereof under the lower flap of the cover sheet.

13. Inserting apparatus for inserting an article into a cover sheet comprising means for making a lower fold in a cover sheet and inserting a portion of an article therein, means for heat sealing portions of the cover sheet adjacent to the fold to the portion of the article contained therein, means for making an upper fold in the cover sheet, means for tucking the upper edge of the upper folded portion of the cover sheet under the upper edge of the lower folded portion of the cover sheet, means for advancing cover sheets successively to each of said means, means for feeding successive cover sheets and articles to the first mentioned means, and means for actuating each of said means, said tucking means including means for carrying the upper edge of the upper folded portion of the cover sheet to a position adjacent to the inside of the upper edge of the lower folded portion of the cover sheet, means for releasing the upper edge of the upper folded portion of the cover sheet from the carrying means when the upper edge of the upper folded portion of the cover sheet is in said adjacent position, and yielding means for urging the upper folded portion of the cover sheet under the lower flap of the cover sheet.

14. Inserting apparatus for inserting an article into a cover sheet comprising means for making a lower fold in a cover sheet and inserting a portion of an article therein, means for heat sealing portions of the cover sheet adjacent to the fold to the portion of the article contained therein, means for making an upper fold in the cover sheet, means for tucking the upper edge of the upper folded portion of the cover sheet under the upper edge of the lower folded portion of the cover sheet, means for advancing cover sheets successively to each of said means, means for feeding successive cover sheets and articles to the first mentioned means, and means for actuating each of said means, said tucking means including a first arcuately moving member having a curved under surface for carrying the upper edge of the upper folded portion of the cover sheet to a position adjacent to the inside of the upper edge of the lower folded portion of the cover sheet and means for releasing the upper edge of the upper folded portion of the cover sheet from the carrying means, the edge of the curved surface being positioned to guide the upper edge of the upper folded portion of the cover sheet under the lower flap of the sheet.

15. Inserting apparatus for inserting an article into a cover sheet comprising means for making a lower fold in a cover sheet and inserting a portion of an article therein, means for heat sealing portions of the cover sheet adjacent to the fold to the portion of the article contained therein, means for making an upper fold in the cover sheet, means for opening said lower fold, means for tucking the upper edge of the upper folded portion of the cover sheet under the upper edge of the lower folded portion of the cover sheet, means for advancing cover sheets successively to each of said means, means for feeding successive cover sheets and articles to the first mentioned means, and means for actuating each of said means, said lower fold opening means including a fixed raised member positioned below the cover sheet adjacent to the upper edge of the lower fold and a member for depressing the lower portion of the cover sheet below the upper edge of the lower fold during operation of the tucking means.

16. Inserting apparatus for inserting an article into a cover sheet comprising means for making a lower fold in a cover sheet and inserting a portion of an article therein, means for heat sealing portions of the cover sheet adjacent to the fold to the portion of the article contained therein, means for making an upper fold in the cover sheet and tucking the upper edge of the upper folded portion of the cover sheet under the upper edge of the lower folded portion of the cover sheet, means for counting covered assemblies, means for advancing cover sheets successively to each of said means, means for feeding successive cover sheets and articles to the first mentioned means, and means for actuating each of said means, said counting means including a register and means positioned by the passage of a cover sheet and actuated by said actuating means when so positioned to actuate said register.

17. Inserting apparatus for inserting an article into a cover sheet comprising means for making a lower fold in a cover sheet and inserting a portion of an article therein, means for heat sealing portions of the cover sheet adjacent to the fold to the portion of the article contained therein, means for making an upper fold in the cover sheet and tucking the upper edge of the upper folded portion of the cover sheet under the upper edge of the lower folded portion of the cover sheet, means for counting covered assemblies, means for advancing cover sheets successively to each of said means, means for feeding successive cover sheets and articles to the first mentioned means, and means for actuating each of said means, said counting means including a register, an element positioned by the passage of a cover sheet and actuated by said actuating means, and a member in driving relation with said register, said member being actuated by said element upon actuation of said element by said actuating means when said element is positioned by the passage of a cover sheet.

18. Inserting apparatus for inserting an article into a cover sheet comprising means for making a lower fold in a cover sheet and inserting a portion of an article therein, means for heat sealing portions of the cover sheet adjacent to the fold to the portion of the article contained therein, means for making an upper fold in the cover sheet and tucking the upper edge of the upper folded portion of the cover sheet under the upper edge of the lower folded portion of the cover sheet, means for counting covered assemblies, means for advancing cover sheets successively to each of said means, means for feeding successive cover sheets and articles to the first mentioned means, and means for actuating each of said means, said counting means including a register, an element positioned by the passage of a cover sheet and actuated by said actuating means, and a member in driving relation with said register, said member being actuated by said element upon actuation of said element by said actuating means only when said element is positioned by the passage of a cover sheet.

19. Inserting apparatus for inserting an article into a cover sheet comprising means for inserting a portion of an article into a lower fold in the cover sheet, means for heat sealing portions of the cover sheet adjacent to the fold to the portion of the article contained therein, the upper end of the cover sheet having a portion thereof folded downwardly upon itself, means for making an upper fold in the catch cover sheet below the downwardly folded portion thereof and for tucking the upper edge of the upper folded portion of the cover sheet under the upper edge of the lower folded portion of the cover sheet, said last mentioned means including means for preventing the downwardly folded portion from bowing inwardly as the fold is made, means for advancing cover sheets successively to each of said means, means for feeding successive cover sheets and articles to the first mentioned means, and means for actuating each of said means.

20. Inserting apparatus for inserting an article into a cover sheet comprising means for inserting a portion of an article into a lower fold in the cover sheet, means for heat sealing portions of the cover sheet adjacent to the fold to the portion of the article contained therein, means for making an upper fold in the cover sheet and tucking the upper edge of the upper folded portion of the cover sheet under the upper edge of the lower folded portion of the cover sheet, means for advancing cover sheets successively to each of said means, means containing a stack of cover sheets, means including a vacuum cup and a generally horizontally moving member for feeding successive cover sheets from the stack to said first mentioned means, means containing a stack of articles, means including a vacuum cup and a generally horizontally moving member for feeding successive articles from the stack to said first mentioned means, and means for actuating each of said means.

21. Inserting apparatus for inserting an article into a cover sheet comprising means for inserting a portion of an article into a lower fold in the cover sheet, means for heat sealing portions of the cover sheet adjacent to the fold to the portion of the article contained therein, means for advancing cover sheets successively to each of said means including means for gripping the bottom folded portion of the cover sheet and the portion of the article contained therein for advancing the cover sheet from the inserting means to the heat sealing means, means for feeding successive cover sheets and articles to the first mentioned means, and means for actuating each of said means.

22. Inserting apparatus for inserting an article into a cover sheet comprising means for inserting a portion of an article into a lower fold in the cover sheet, means for heat sealing portions of the cover sheet adjacent to the fold to the portion of the article contained therein, means for making an upper fold in the cover sheet, means for opening said lower fold, means for tucking the upper edge of the upper folded portion of the cover sheet, under the upper edge of the lower folded portion of the cover sheet, means for advancing cover sheets successively to each of said means, means for feeding successive cover sheets and articles to the first mentioned means, and means for actuating each of said means.

23. Inserting apparatus for inserting an article into a cover sheet comprising a conveyor, means for delivering a flat cover sheet from a stack of cover sheets in a magazine to a first position on said conveyor, means for making a lower fold in the flat cover sheet in a second position on said conveyor, means for withdrawing an article from a stack of articles and for inserting a portion of the article into the lower fold in the cover sheet in a third position on said conveyor, means for sealing a portion of the cover sheet to a portion of the articles contained therein in a fourth position on said conveyor, means for making an upper fold in the cover sheet and inserting the upper edge of the upper folded portion under the upper edge of the lower folded portion of the cover sheet in a fifth position on said conveyor, a discharge position forming a sixth position on said conveyor, and means for actuating said conveyor for advancing the cover sheet successively to each of said positions and for actuating each of said means.

24. Inserting apparatus for inserting an article into a cover sheet comprising means for delivering a flat cover sheet from a stack of cover sheets in a magazine to a first position, means for making a lower fold in the flat cover sheet in a second position, means for withdrawing an article from a stack of articles and for inserting a portion of the article into the lower fold in the cover sheet in a third position, means for sealing a portion of the cover sheet to a portion of the articles contained therein in a fourth position, means for making an upper fold in the cover sheet and inserting the upper edge of the upper folded portion under the upper edge of the lower folded portion of the cover sheet in a fifth position, a discharge position forming a sixth position, means for advancing a cover sheet successively past said various positions, and guide means adjacent to said advancing means extending between said second position and said third position for positioning the lower ends of the cover sheets advancing to said third position.

25. Inserting apparatus for inserting an article into a cover sheet comprising means for delivering a flat cover sheet from a stack of cover sheets in a magazine to a first position, means for making a lower fold in the flat cover sheet in a second position, means for withdrawing an article from a stack of articles and for inserting a portion of the article into the lower fold in the cover sheet in a third position, means for sealing a portion of the cover sheet to a portion of the articles contained therein in a fourth position, means for making an upper fold in the cover sheet and inserting the upper edge of the upper folded portion under the upper edge of the lower folded portion of the cover sheet in a fifth position, a discharge position forming a sixth position, means for advancing a cover sheet successively past said various positions, and guide means adjacent to said advancing means extending between said fourth position and said fifth position for positioning the upper ends of the cover sheets advancing to said fifth position.

References Cited in the file of this patent

UNITED STATES PATENTS

| | | |
|---|---|---|
| 1,042,472 | Paridon | Oct. 29, 1912 |
| 1,091,568 | Garfield | Mar. 31, 1914 |
| 1,203,906 | Paridon | Nov. 7, 1916 |
| 1,272,510 | Paridon | July 16, 1918 |
| 1,468,310 | Nolan | Sept. 18, 1923 |
| 2,224,017 | Gurwick | Dec. 3, 1940 |
| 2,342,236 | Allen | Feb. 22, 1944 |
| 2,591,935 | Heigl | Apr. 8, 1952 |